United States Patent [19]

Blankenship

[11] Patent Number: 4,890,858
[45] Date of Patent: Jan. 2, 1990

[54] METHOD AND APPARATUS FOR CONTROLLING SHOCK ABSORBERS
[75] Inventor: David R. Blankenship, Dearborn Heights, Mich.
[73] Assignee: Monroe Auto Equipment Company, Monroe, Mich.
[21] Appl. No.: 156,533
[22] Filed: Feb. 16, 1988
[51] Int. Cl.⁴ .............................................. B60G 17/00
[52] U.S. Cl. ...................................... 280/707; 280/714
[58] Field of Search ..................... 280/707, 714, 6.12, 280/DIG. 1; 180/41

[56] References Cited

U.S. PATENT DOCUMENTS

| | | |
|---|---|---|
| 139,096 | 5/1873 | Ware . |
| 264,525 | 9/1882 | Glenn . |
| 294,216 | 2/1884 | Fletcher . |
| 329,650 | 11/1885 | Jackson . |
| 505,850 | 10/1893 | Rothchild . |
| 565,845 | 8/1896 | Douglas . |
| 616,796 | 12/1898 | Mitchell . |
| 631,435 | 8/1899 | Pickles . |
| 725,456 | 4/1903 | Lemp . |
| 1,403,003 | 1/1922 | Beatson . |
| 1,517,877 | 12/1924 | Wallem . |
| 1,544,608 | 7/1925 | Smith et al. . |
| 1,819,343 | 8/1931 | Shipley . |
| 2,061,068 | 11/1936 | Fuchs . |
| 2,566,071 | 8/1951 | Schobert . |
| 2,717,058 | 9/1955 | Brundrett . |
| 3,039,566 | 6/1961 | Rumsey . |
| 3,110,322 | 11/1963 | Bozoyan . |
| 3,124,368 | 3/1964 | Corley et al. . |
| 3,495,625 | 3/1970 | Shuttleworth et al. . |
| 3,506,239 | 4/1970 | Johnson . |
| 4,031,989 | 6/1977 | Blazquez . |
| 4,065,154 | 12/1977 | Glaze . |
| 4,325,468 | 4/1982 | Siorek . |
| 4,333,668 | 6/1982 | Hendrickson et al. . |
| 4,468,050 | 8/1984 | Woods et al. . |
| 4,469,315 | 9/1984 | Nichols et al. . |
| 4,526,401 | 7/1985 | Kakizaki et al. . |
| 4,597,411 | 7/1986 | Lizell . |
| 4,598,929 | 7/1986 | Kumagai et al. . |
| 4,620,619 | 11/1986 | Emura et al. . |
| 4,635,960 | 1/1987 | Shirakuma . |
| 4,638,896 | 1/1987 | Poyser . |
| 4,645,044 | 2/1987 | Kato et al. . |
| 4,648,622 | 3/1987 | Wada et al. . |
| 4,660,686 | 4/1987 | Munning et al. . |
| 4,660,688 | 4/1987 | Spisak et al. . |
| 4,673,067 | 6/1987 | Munning et al. . |
| 4,696,489 | 9/1987 | Fujishiro et al. ................... 280/707 |
| 4,697,237 | 9/1987 | Tanaka et al. ...................... 280/707 |
| 4,700,303 | 10/1987 | Tokuyama et al. ................. 280/707 |

FOREIGN PATENT DOCUMENTS

| | | |
|---|---|---|
| 0123365 | 10/1984 | European Pat. Off. . |
| 0166313 | 1/1986 | European Pat. Off. . |
| 0186908 | 7/1986 | European Pat. Off. . |
| 0200446 | 11/1986 | European Pat. Off. . |
| 2911768 | 10/1980 | Fed. Rep. of Germany . |
| 3334704 | 11/1984 | Fed. Rep. of Germany . |
| 3334704.2 | 4/1985 | Fed. Rep. of Germany . |
| 3425988 | 1/1986 | Fed. Rep. of Germany . |
| 3428306 | 2/1986 | Fed. Rep. of Germany . |
| 8702817.4 | 6/1987 | Fed. Rep. of Germany . |
| 3348176 | 2/1988 | Fed. Rep. of Germany . |
| 2552515 | 9/1984 | France . |
| 57-173629 | 10/1982 | Japan . |
| 57-173630 | 10/1982 | Japan . |
| 60-157537 | 8/1985 | Japan . |
| 86/00212 | 5/1985 | PCT Int'l Appl. . |
| 85/04698 | 10/1985 | PCT Int'l Appl. . |
| 87/00618 | 3/1987 | PCT Int'l Appl. . |
| 664770 | 1/1952 | United Kingdom . |
| 1450441 | 9/1976 | United Kingdom . |
| 2117875 | 10/1983 | United Kingdom . |
| 2147683 | 5/1985 | United Kingdom . |
| 2177475 | 1/1987 | United Kingdom . |

Primary Examiner—Kenneth R. Rice
Attorney, Agent, or Firm—Harness, Dickey & Pierce

[57] ABSTRACT

A method and apparatus for controlling shock absorbers as disclosed. The apparatus comprises a first valve member disposed within the pressure chamber of the shock absorber for establishing a first plurality of flow passages. The apparatus further comprises a second valve member also disposed within the pressure cylinder of the shock absorber for establishing a second plurality of flow passages. In additon, the apparatus comprises an actuator for providing an accelerating and decelerating force to the second valve member. Control means for controlling the displacement of the second valve member is also provided.

48 Claims, 18 Drawing Sheets

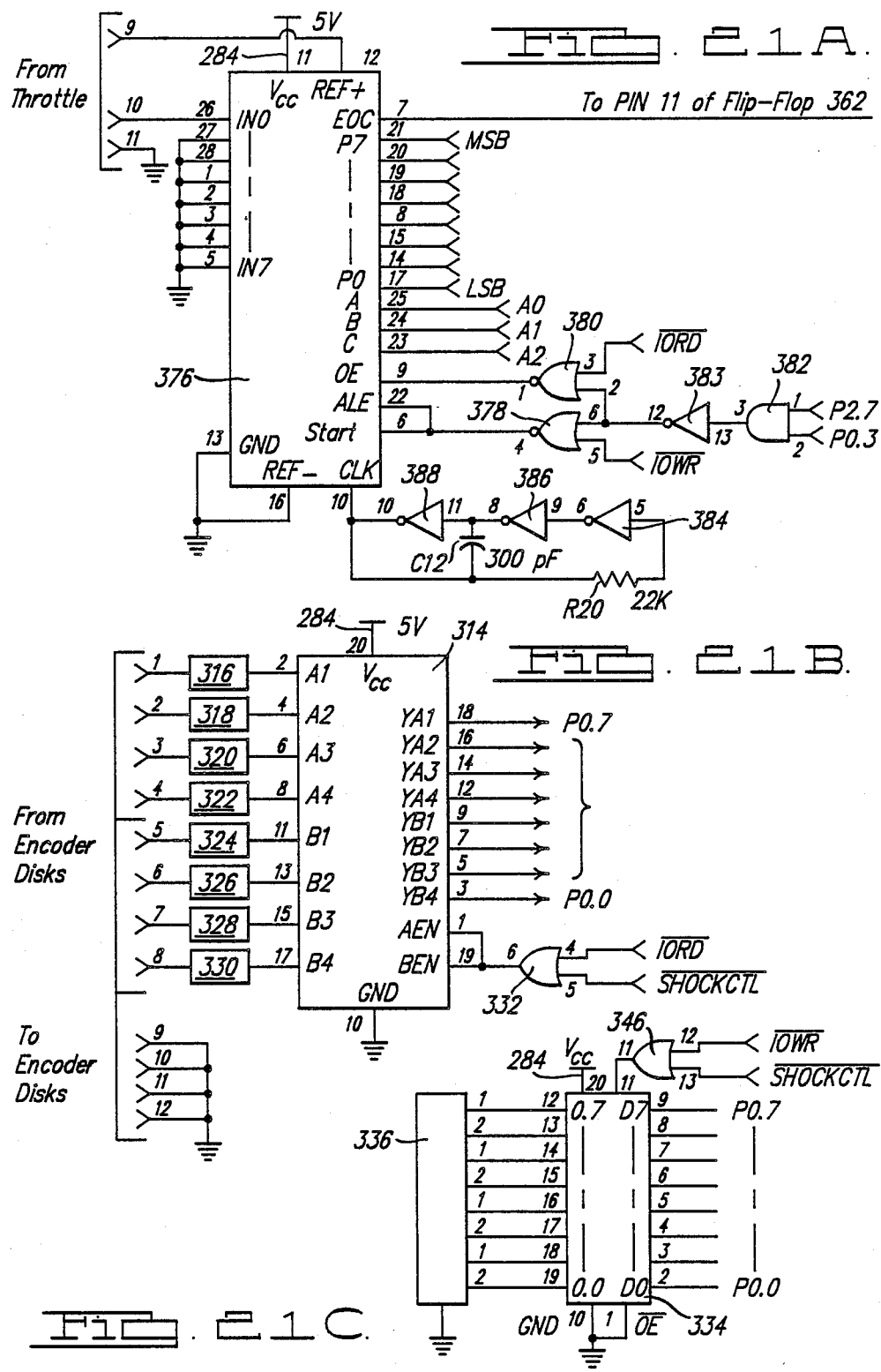

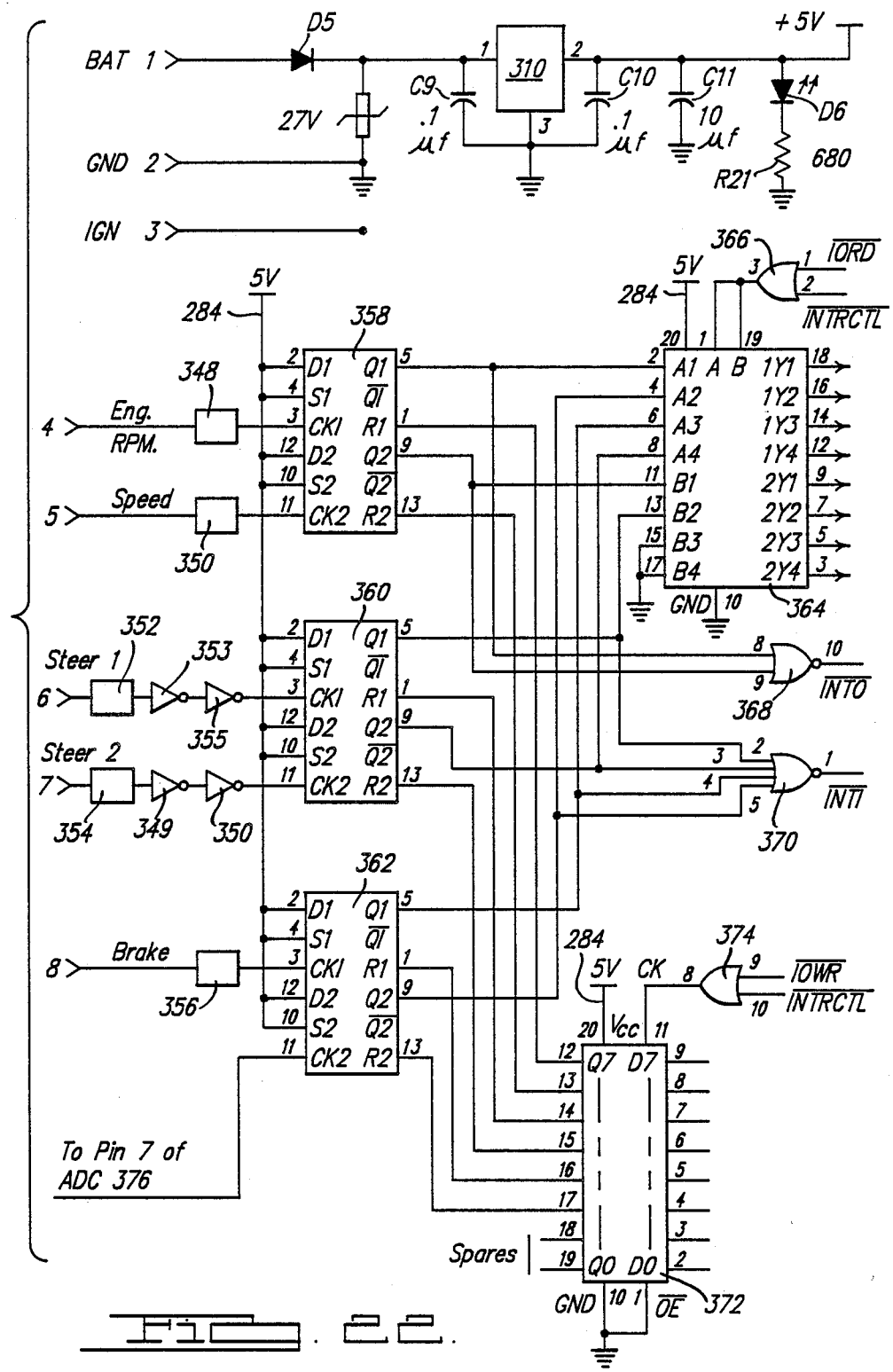

METHOD AND APPARATUS FOR CONTROLLING SHOCK ABSORBERS

BACKGROUND OF THE INVENTION

1. Field of the Invention

This invention relates to suspension systems for automobiles and machines which receive mechanical shock, and more particularly to a method and apparatus for controlling shock absorbers.

2. Description of Related Art

Shock absorbers are used in connection with automotive suspension systems to absorb unwanted vibrations which occur during driving. To absorb unwanted vibrations, shock absorbers are generally connected between the body and the suspension of the automobile. A piston is located within the shock absorber and is connected to the body of the automobile through a piston rod. Because the piston is able to limit the flow of damping fluid within the working chamber of the shock absorber when the shock absorber is compressed or extended, the shock absorber is able to produce a damping force which counteracts the vibration which would otherwise be transmitted from the suspension to the body. The greater the degree to which the flow of damping fluid within the working chamber is restricted by the piston, the greater the damping forces which are generated by the shock absorber.

In selecting the amount of damping that a shock absorber is to provide, three vehicle performance characteristics are often considered: ride comfort, vehicle handling and road holding ability. Ride comfort is often a function of the spring constant of the main springs of the vehicle, as well as the spring constant of the seat, tires, and the shock absorber. Vehicle handling is related to the variation in the vehicle's attitude (i.e., roll, pitch and yaw). For optimum vehicle handling, relatively large damping forces are required to avoid excessively rapid variation in the vehicle's attitude during cornering, acceleration, and deceleration. Road holding ability is generally a function of the amount of contact between the tires and the ground. To optimize road holding ability, large damping forces are required when driving on irregular surfaces to prevent loss of contact between the wheels and the ground for an excessive period of time.

Because different driving characteristics depend on the amount of damping forces the shock absorber provides, it is often desirable to have a shock absorber in which the amount of damping forces generated by the shock absorber is adjustable. One method for selectively changing the damping characteristics of a shock absorber is disclosed in European patent application Ser. No. 85116585.2. European patent application Ser. No. 85116585.2, a controller detects the distance between the body of the automobile and the front wheel so as to determine the contour of the surface. A rotary valve in each of the rear shock absorbers is then adjusted so that the rear shock absorbers are able to provide the desired amount of damping forces. Another method for selectively changing the damping characteristics of a shock absorber is disclosed in U.S. Pat. No. 4,600,215. In this reference, an ultrasonic sensor is used to determine the vertical displacement of the vehicle body from the road surface. The output from the sensor is compared to a reference signal which is responsive to vehicle speed. The result of the comparison provides an indication of the contour of the road surface which is used by the suspension system controller to adjust a rotary valve in each of the shock absorbers.

In those circumstances where a rotary valve is used to control the damping characteristics of the shock absorber, it is often necessary to stop the shutter sleeve of the rotary valve at a specific position to achieve the desired damping forces. If the final position of the shutter sleeve deviates from the desired position beyond a certain angular displacement, the rotary valve will allow either a greater or lesser amount of damping fluid to flow between the upper and lower portions of the working chamber of the shock absorber than desired. Accordingly, the resulting damping force will be different from that which is desired.

SUMMARY OF THE INVENTION

Accordingly, it is the primary object of the present invention to provide a method and apparatus for controlling shock absorbers in which the amount of damping fluid flowing between the upper and lower portions of the working chamber may be controlled with a relatively high degree of accuracy. A related object of the present invention is to provide a method and apparatus for controlling shock absorbers in which the amount of damping forces generated by the shock absorber can be adjusted with a relatively high degree of accuracy.

Another object of the present invention is to provide a method and apparatus for controlling shock absorbers in which the position of a rotary valve used for adjusting the flow of damping fluid may be controlled with a relatively high degree of accuracy.

A further object of the present invention is to provide a method and apparatus for controlling shock absorbers in which a braking torque may be applied by the actuator of a rotary valve so that the angular positioning of the rotary valve may be controlled with a relatively high degree of accuracy. A related object of the present invention is to provide a method and apparatus for controlling shock absorbers in which the coils in the actuator used for driving a rotary valve may be grounded so as to dissipate energy stored in the electromagnetic field of the actuator.

A further object of the present invention is to provide a method and apparatus for controlling shock absorbers in which a relatively high degree of angular deceleration may be applied to a rotary valve by the actuator. A related object of the present invention is to provide a method and apparatus for controlling shock absorbers in which a rotary valve used for controlling shock absorbers can quickly change the damping characteristics of the shock absorber.

A further object of the present invention is to provide a method and apparatus for controlling shock absorbers which is relatively inexpensive yet is able to accurately control the damping forces generated by the shock absorber.

BRIEF DESCRIPTION OF THE DRAWINGS

Various advantages of the present invention will become apparent to one skilled in the art upon reading the following specification and by reference to the following drawings in which:

FIGS. 20–22 are schematic diagrams of the electronic control module shown in FIG. 19;

DESCRIPTION OF THE PREFERRED EMBODIMENTS

Figure 1:
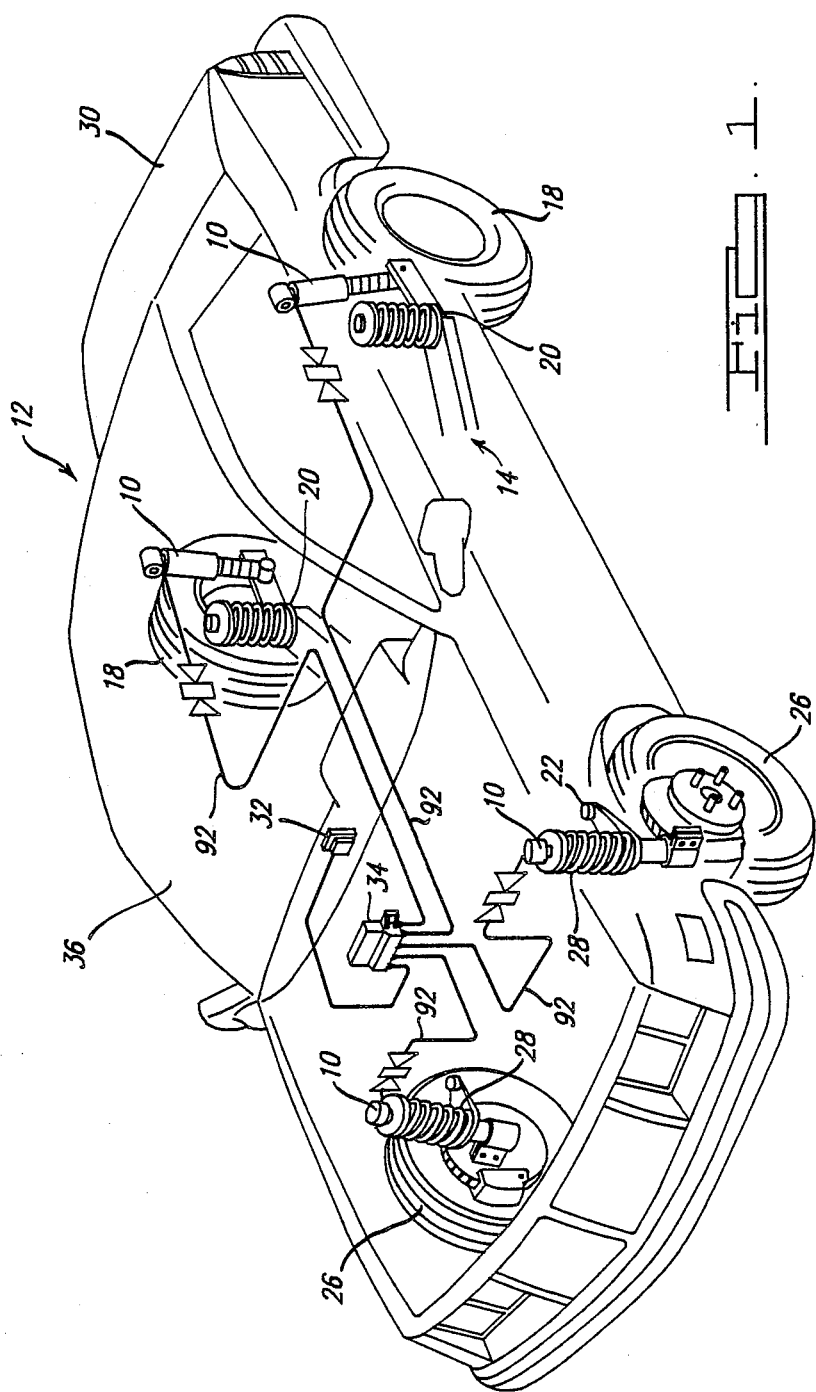
FIG. 1 is an illustration of an automobile using the method and apparatus for controlling shock absorbers according to the teachings of the preferred embodiment of the present invention.

Referring to FIG. 1, a plurality of four shock absorbers 10 according to the preferred embodiment of the present invention are shown. The shock absorbers 10 are depicted inoperative association with a diagrammatic representation of a conventional automobile 12. The automobile 12 includes a rear suspension system 14 having a transversely extending rear axle assembly (not shown) adapted to operatively support the vehicle's rear wheels 18. The rear axle assembly is operatively connected to the automobile 12 by means of a pair of shock absorbers 10 as well as by the helical coil springs 20. Similarly, the automobile 12 has a front suspension system 22 including a transversely extending front axle assembly (not shown) to operatively support the front wheels 26. Front axle assembly is operatively connected to the automobile 12 by means of a second pair of shock absorbers 10 and by the helical coil springs 28. The shock absorbers 10 serve to damp the relative movement of the unsprung portion (i.e., the front and rear suspension systems 22 and 14) and the sprung portion (i.e., the body 30) of the automobile 12. While the automobile 12 has been depicted as a passenger car, the shock absorber 10 may be used with other types of automotive vehicles or in other types of applications. Further, the term "shock absorber" as used herein will refer to shock absorbers in the general sense of the phrase and will include MacPherson struts.

To allow the damping characteristics of the shock absorbers 10 to be controlled, a switch 32 and an electronic control module 34 are provided. The switch 32 is located within the passenger compartment 36 of the automobile 12 and is accessible by the occupants of the automobile 12. The switch 32 is used for selecting which type of damping characteristics the shock absorbers 10 are to provide (i.e., firm, soft or medium). The electronic control module 34 receives the output from the switch 32 and is used for generating an electronic control signal for controlling damping characteristics of the shock absorbers 10. As will be discussed below, the electronic control module 34 may either be formed using discrete components or may comprise a computer which digitally controls the operation of the shock absorbers 10. By controlling the damping characteristics of the shock absorbers 10, the shock absorbers 10 are able to controllably dampen relative movement between the body 30 and the suspension of the automobile 12 so as to optimize both ride comfort and road handling ability.

Figure 2:
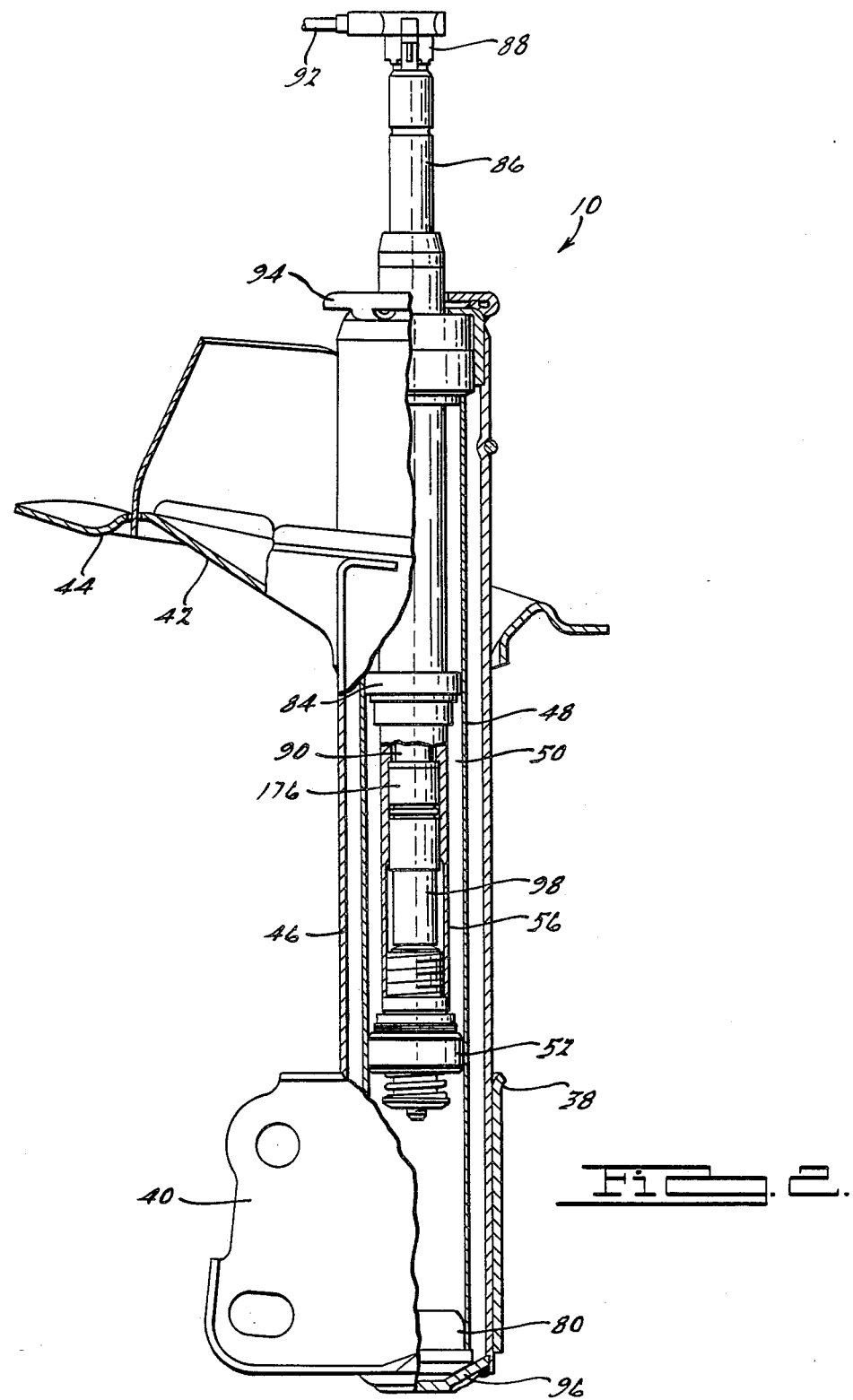
FIG. 2 is the schematic representation of the shock absorber using the method and apparatus for controlling shock absorbers according to the teachings of the preferred embodiment of the present invention.
Figure 3:
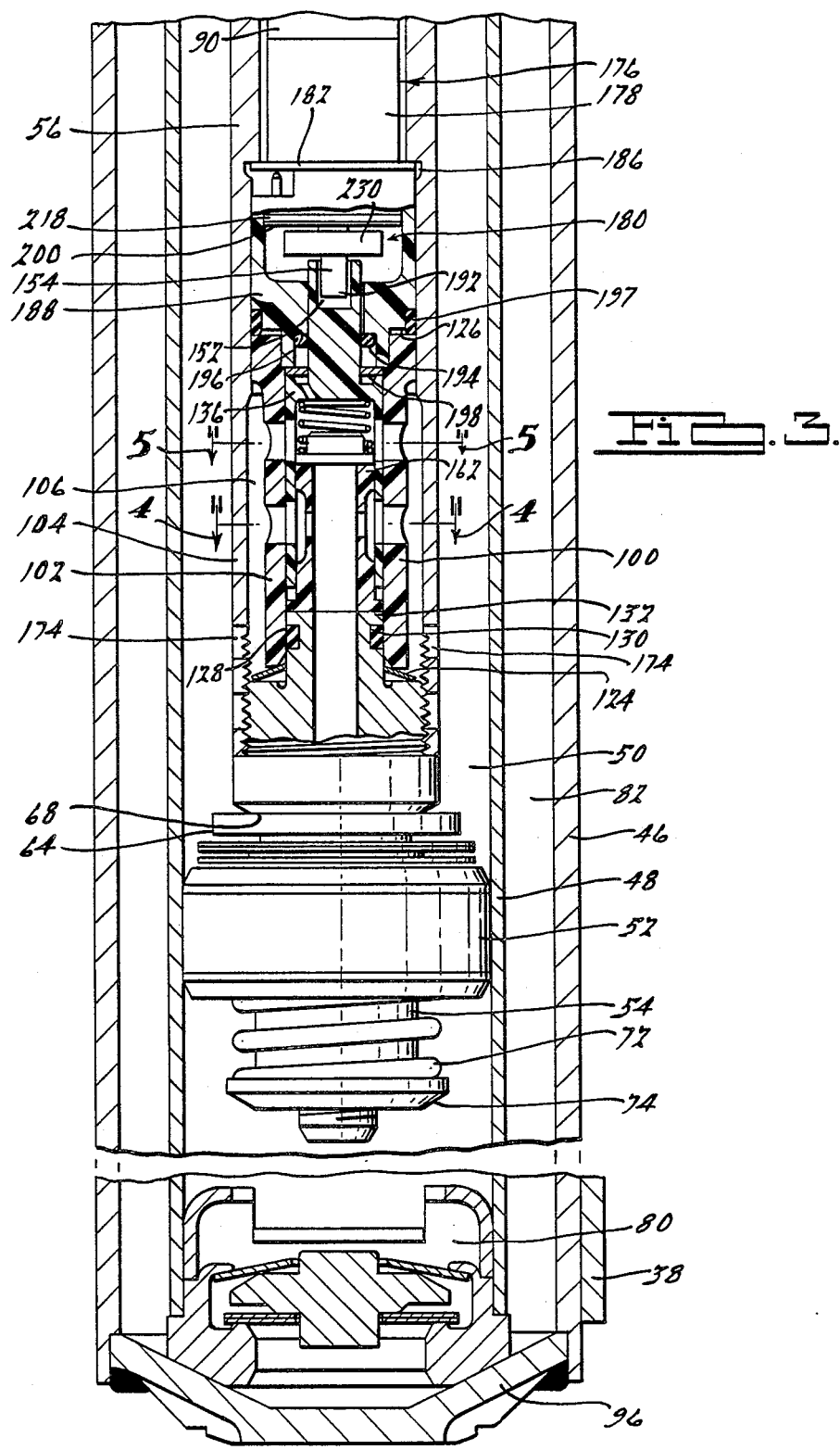
FIG. 3 is a side elevational view, partially broken away, of the lower portion of the shock absorber shown in FIG. 2.
Figures 4, 5:
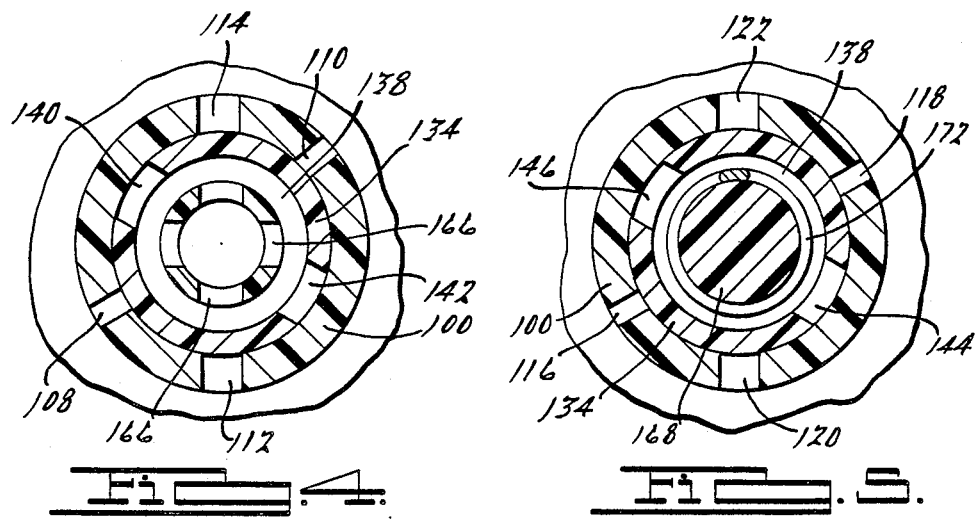
FIG. 4 is a view taken in the direction of line 4—4 in FIG. 3.
FIG. 5 is a view taken in the direction of line 5—5 in FIG. 3.
Figure 6:
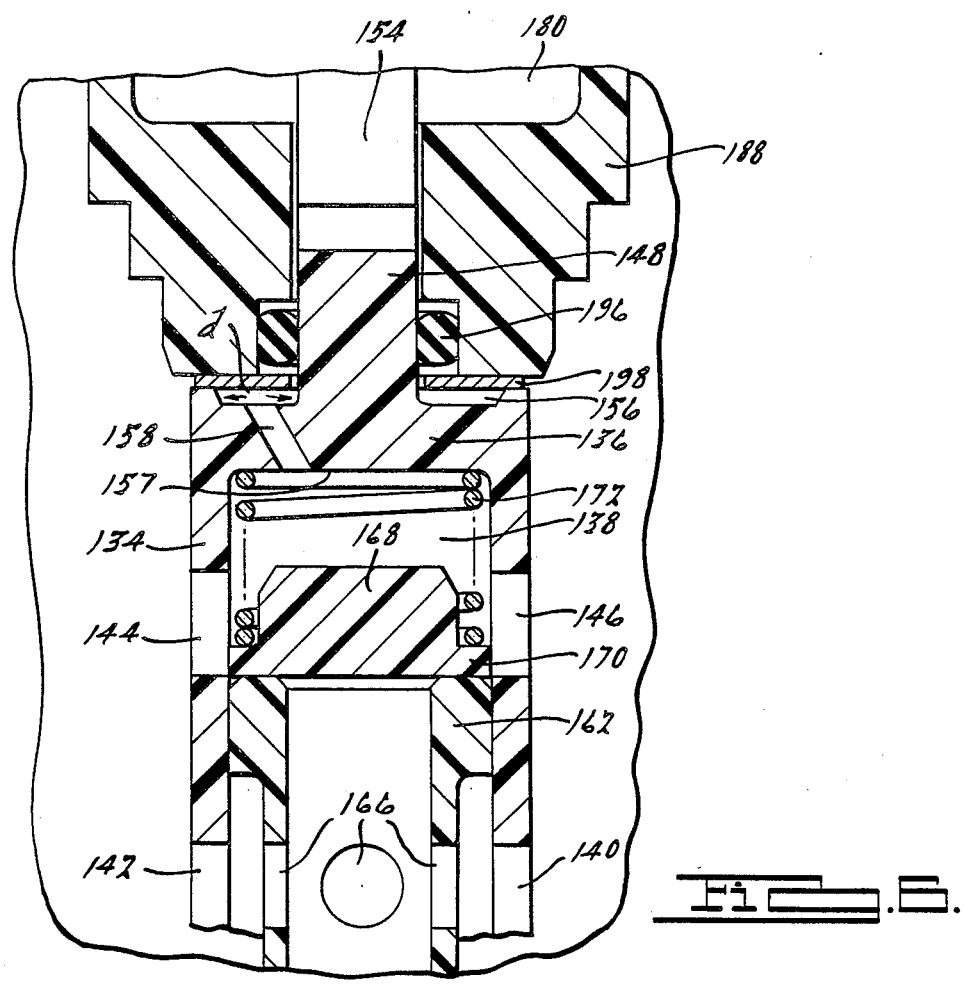
FIG. 6 is a view of the upper portion of the rotary valve shown in FIG. 3.

To support the shock absorber 10, the shock absorber 10 further comprises a generally sleeve-shaped wheel spindle section 38 as shown in FIGS. 2 and 3. The wheel spindle section 38 extends around the periphery of the shock absorber 10 and is fixedly secured thereto by welding. The wheel spindle section 38 includes a radially outwardly extending portion 40 which is adapted to be connected by suitable screws, bolts or other threaded fastening means to a suitable flange (not shown) on the wheel spindle. In addition, the shock absorber 10 is provided with a generally radially outwardly extending spring support plate, generally designated as 42 that includes a radially outwardly extending flange portion 44 upon which the lower end of the coil spring 28 is supported. The inner periphery of the plate 42 is secured as by welding to the outer periphery of the housing 46 of the shock absorber 10. The upper end of the spring 28 is adapted to bear against a similar plate (not shown) which in turn acts against the associated frame or chassis portion of the automobile 12 whereby the associated chassis is spring supported upon the coil spring 28 in a manner well-known in the art.

Figure 7:
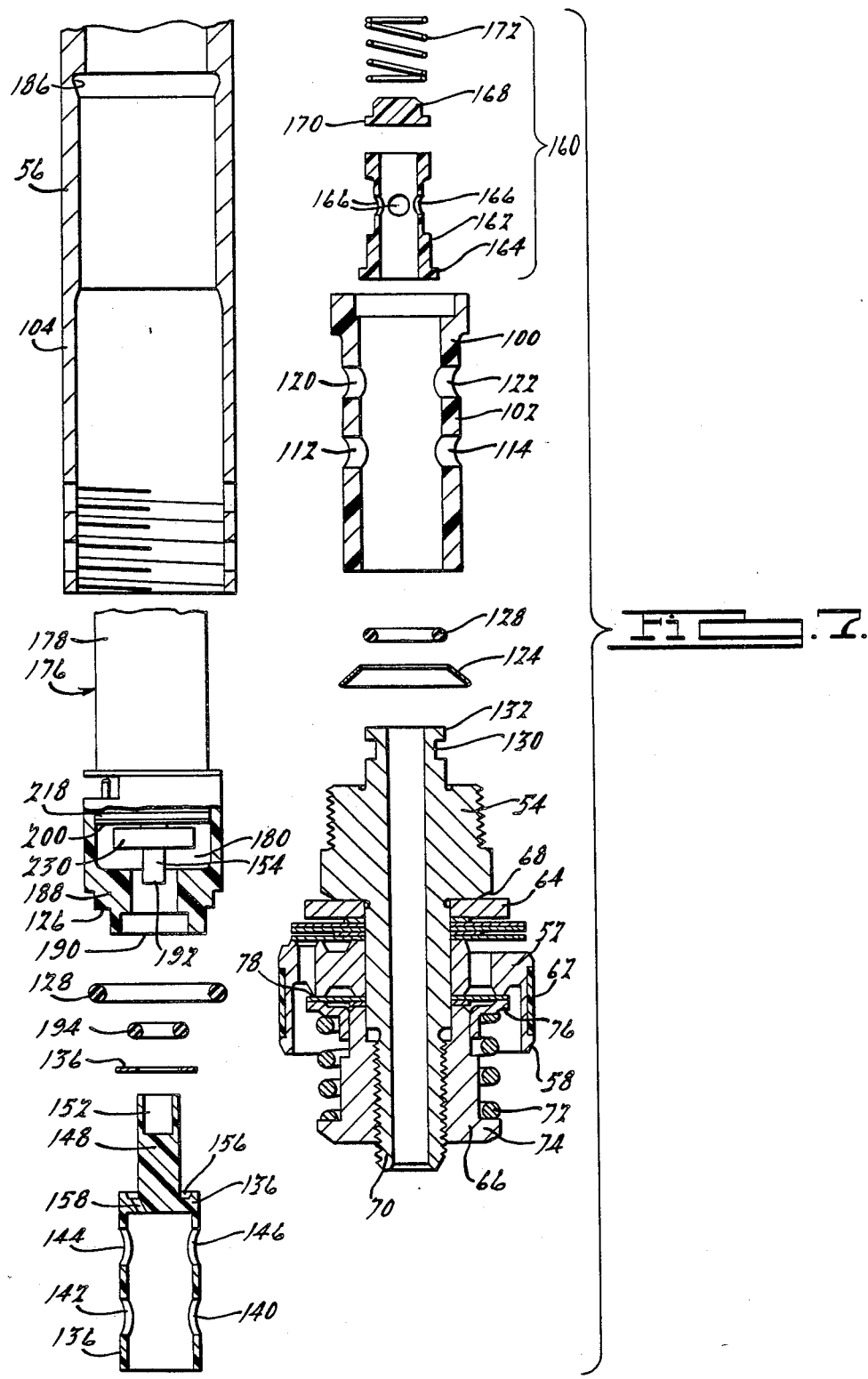
FIG. 7 is an elevated perspective exploded view of the lower portion of the piston rod shown in FIG. 3 showing the actuator, rotary valve and piston.

The shock absorber 10 comprises an elongated tubular pressure cylinder 48 defining a damping fluid-containing working chamber 50. Disposed within the chamber 50 is a reciprocal piston 52. The reciprocal piston 52 is secured to one end of an axially extending piston post 54 which is in turn secured to an axially extending piston rod 56. As shown in FIG. 7, the piston 52 comprises a housing 58 having a plurality of ridges (not shown) disposed on the annular exterior of the piston housing 58. The ridges are used to secure an annular teflon sleeve 62 which is disposed between the ridges of the piston housing 58 and the pressure cylinder 48. The teflon sleeve 62 permits movement of the piston 52 with respect to the pressure cylinder 48 without generating undue frictional forces.

Upward movement of the piston 52 is limited by an annular spacer 64 which is disposed between the piston 52 and a radially extending step portion 68 of the piston post 54. Downward movement of the piston 52 is limited by a threaded nut 66 or similar type fastening element which is threadably received upon the lower portion 70 of the piston post 54. A helical coil spring 72 is arranged concentrically of the nut 66 and is supported at the lower end thereof by a radially outwardly extending flange 74 on the lower end of the nut 66. The upper end of the spring 72 bears against a spring retainer 76 which in turn acts against the underside of a valve disk 78 thereby resiliently urge the valve disk 78 into sealing engagement with the piston housing 58. A further explanation of the construction and operation of the piston is disclosed in U.S. Pat. No. 4,113,072, which is hereby incorporated by reference.

A base valve, generally designated by the numeral 80, is located within the lower end of the pressure cylinder 48 and is used to control the flow of damping fluid between the working chamber 50 and an annular fluid reservoir 82. The annular fluid reservoir 82 is defined as the space between the outer periphery of the pressure cylinder 48 and the inner periphery of the housing 46. The construction and operation of the base valve 80 may be of the type shown and described in U.S. Pat. No. 3,771,626, which is hereby incorporated by reference.

The shock absorber 10 further comprises an anti-topping device 84 which is mounted coaxially on the piston rod 56 as shown in FIG. 2. The anti-topping device 84 is used for preventing excessive upward movement of the piston rod 56 during rebound of the shock absorber 10. The construction and operation of the anti-topping device 84 may be of the type shown and described in U.S. Ser. No. 170.821 which is hereby incorporated by reference.

The upper end portion 86 of the piston rod 56 further includes a connector 88. The connector 88 is used to provide electrical communication between the flex cable 90 which is connected to the actuator described below and the cables 92 leading to the electronic control module 34. The construction and operation of the connector 88 may be a type shown and described in U.S. Ser. No. 105.404, which is hereby incorporated by reference. However, other suitable connectors may be used. In addition, the shock absorber 10 also comprises generally cup-shaped upper and lower end caps 94 and 96 respectively. The upper and lower end caps 94 and 96 are secured to opposing ends of the housing 46 by a suitable means such as welding.

To provide means for regulating the flow of damping fluid between the upper and lower portions of the working chamber 50, a rotary valve 98 is provided. The rotary valve 98 permits a greater amount of fluid to flow between the upper and lower end portions of the working chamber 50 than is permitted by the piston 52 itself. Accordingly, when a firm compression and rebound stroke is desired, the rotary valve 98 may be closed so as to permit damping fluid to flow only through the piston 52. When a medium or soft compression and rebound stroke is desired, the rotary valve 98 is opened to varying degrees so that the amount of damping fluid flowing between the upper and lower portions of the working chamber 50 may be increased. The amount of damping fluid flowing through the rotary valve 98 is adjusted by an actuator described below which in turn is electrically controlled by the electronic control module 34. Accordingly, the driver of the automobile 12 may choose the desired amount of damping characteristics the shock absorber 10 is able to provide by adjusting the switch 32. The electronic control module 34 generates an electronic control signal in response to the output from the switch 32 which is used to control the damping fluid flowing through the rotary valve 98. The operation of the rotary valve 98 is more thoroughly described below.

The rotary valve 98 comprises an annular orifice sleeve 100 which is coaxially disposed within the piston rod 56. The lower end portion of the orifice sleeve 100 has a reduced diameter section 102 which mates with an increased internal diameter section 104 of the piston rod 56 so as to form a cavity 106 therebetween. Fluid from the upper portion of the working chamber 50 is able to flow into the cavity 106 by means of a plurality of radially extending flow passages 174 in the increased diameter section 104 of the piston rod 54. To support the orifice sleeve 100 in an upward direction, a disk-shaped spring 124 is provided. The spring 124 is disposed between the lower portion of the orifice sleeve 100 and the upper portion of the piston post 54 so as to bias the orifice sleeve 100 in an upward direction. The orifice sleeve 100 also has a step 126 which engages the sensor housing of the actuator described below so as to limit upward movement of the orifice sleeve 100. Damping fluid is prevented from flowing between the orifice sleeve 100 and the piston post 54 by an annular retaining seal 128. The annular retaining seal 128 is disposed within an annular groove 130 in an axially extended portion 132 of the piston post 54.

The orifice sleeve 100 has a plurality of flow passages 108-122. The centers of the flow passages 108-114 are disposed on a plane which is perpendicular to the axis of the orifice sleeve 100. Further, the flow passages 116-122 are axially displaced from the flow passages 108-114 and are disposed on a plate which is perpendicular to the axis of the orifice sleeve 100. The flow passages 112 and 114 are substantially identical and are spaced 180° apart and have a diameter of 0.141 inches. The flow passages 108 and 110 are angularly displaced by 60° from the flow passages 112 and 114 respectively and have a diameter of 0.040". The flow passages 108 and 110 are axially displaced along the orifice sleeve 100 from the flow passages 116 and 118, while the flow passages 112 and 114 are axially displaced from the flow passages 120 and 122. Further, the flow passages 116 and 118 have the same diameter as the flow passages 108 and 110, while the flow passages 120 and 122 have the same diameter as the flow passages 112 and 114. Because of their relatively large diameter, a soft rebound and compression stroke is generated by the shock absorber 10 when damping fluid is flowing through the flow passages 112, 114, 120 and 122. Similarly, when damping fluid is flowing through the flow passages 108, 110, 116 and 118, a medium compression and rebound stroke is generated. Finally, when damping fluid is not flowing through any of the flow passages 108-122 in the orifice sleeve 100, a firm compression and rebound stroke is generated since the flow of damping fluid is regulated only by the piston 52.

To control the flow of damping fluid flowing through the flow passages 108-122 in the orifice sleeve 100, the rotary valve 98 further comprises an annular shutter sleeve 134 with a closed upper end portion 136 and a central bore 138. The shutter sleeve 134 is disposed coaxially within the orifice sleeve 100, with the radially outer surface of the shutter sleeve 134 being adjacent to the radially inner surface of the orifice sleeve 100. The shutter sleeve 134 has a plurality of flow passages 140-146. The flow passages 140 and 142 are disposed symmetrically about a plane passing axially through the center of the shutter sleeve 134, while the flow passages 144 and 146 are disposed symmetrically about a plane passing axially through the center of the shutter sleeve 134. The centers of the flow passages 140 and 142 lie within the plane established by the centers of the flow passages 108–114 in the orifice sleeve 100. Similarly, the center of the flow passages 144 and 146 lies within the plane established by the centers of the flow passages 116–122 in the orifice sleeve 100. The flow passages 140 and 142 have a diameter of 0.188" and are spaced 180° apart, while the flow passages 144 and 146 have a diameter of 0.188" and are also spaced apart by 180°. As will be more thoroughly discussed below, rotation of the shutter sleeve 134 controls the flow of damping fluid through the flow passages 140–146 of the shutter sleeve 134 and the flow passages 108–114 in the orifice sleeve 100.

When the shutter sleeve 134 is rotated such that the flow passages 140–146 in the shutter sleeve 134 are aligned with the flow passages 112, 114, 120 and 122 in the orifice sleeve 100, damping fluid is able to flow between the upper and lower portions of the working chamber 50 through the flow passages 140–146 and the flow passages 112, 114, 120 and 122. Because the flow passages 112, 114, 120 and 122 in the orifice sleeve 100 are relatively large, a soft compression and rebound stroke is generated.

When the shutter sleeve 134 is rotated further so that the flow passages 140–146 in the shutter sleeve 134 become aligned with the flow passages 108, 110, 116, and 118 in the orifice sleeve 100, a medium compression and rebound stroke is generated as the flow passages 108, 110, 116 and 118 are relatively small. When the shutter sleeve is rotated further such that the flow passages 140–146 in the shutter sleeve 134 are not aligned with any of the flow passages 108–122 in the orifice sleeve 100, damping fluid is unable to flow through the rotary valve 98. Accordingly, the flow of damping fluid between the upper and lower portions of the working chamber 50 is governed by the piston 52 which provides a firm damping characteristic as discussed above. It will be noted that the flow passages 116–122 in the orifice sleeve 100 and the flow passages 120 and 122 in the shutter sleeve 134 are used in conjunction with a check valve described below.

The shutter sleeve 134 further comprises an axially extending projection 148 disposed on the closed upper end portion 136 of the shutter sleeve 134 having a downwardly extending slot 152. The projection 148 extends in the direction towards the upper portion of the working chamber 50 and is used to engage the shaft 154 of the actuator described below which is used to rotate the shutter sleeve 134. By rotating the shutter sleeve 134, the flow passages 140–146 in the shutter sleeve 134 are able to selectively mate with the flow passages 108–122 in the orifice sleeve 100 so that the flow of damping fluid between the upper and lower portions of the working chamber 50 can be controlled.

The shutter sleeve 134 further comprises an annular recess 156 which is located on the upper surface of the closed upper end portion 136. The annular recess 156 fluidly communicates with damping fluid in the central bore 138 of the shutter sleeve 134 through a flow passage 158 extending therebetween. The annular recess 156 extends radially from the perimeter of the projection 148 to distance d from the perimeter of the projection 148. The distance d is selected so that the surface area of the annular recess 156 is substantially the same as the surface area of the lower surface 157 of the closed upper end portion 136 which faces the central bore 138. Because the area of the annular recess 156 is substantially the same as the area of the lower surface 157 of the closed upper end portion 136, the force exerted on the shutter sleeve 134 by the pressure in the central bore 138 is the same as the pressure exerted by the damping fluid in the annular recess 156. Accordingly, there is a substantial absence of axial force exerted on the shutter sleeve 134 so that the frictional forces which would otherwise be generated upon rotation of the shutter sleeve 134 are substantially eliminated. The actuator described below may therefore rotate the shutter sleeve 134 at a faster rate than would otherwise be possible.

To provide means for generating a soft compression stroke relative to the rebound stroke, a check valve 160 is provided. The check valve 160 comprises an annular check valve sleeve 162 which is located coaxially within the central bore 138 of the shutter sleeve 134. The lower portion of the check valve sleeve 162 has a radially extending flange 164 which abuts the upper portion of the piston post 54. The check valve sleeve 162 extends from the piston post 54 in a direction towards the upper portion of the working chamber to a point just below the flow passages 144–146 in the shutter sleeve 134. The check valve sleeve 162 has a plurality of radially extending flow passages 166, the centers of which occupy a plane which is coplanar with the plane established by the centers of the flow passages 116–122 in the orifice sleeve 100. Accordingly, damping fluid is able to flow between the upper and lower portions of the working chamber 50 through the flow passages 166 in the check valve sleeve 162 and the flow passages 116–122 in the orifice sleeve 100 when the flow passages 144–146 in the shutter sleeve 134 are aligned with the flow passages 116–122 in the orifice sleeve 100.

The check valve 160 further comprises a closure member 168 which is located within the central bore 138 of the shutter sleeve 134 and is disposed coaxially with respect to the check valve sleeve 162 at the upper end portion thereof. The closure member 168 has a radially extending flange 170 which is able to mate with the upper end portion of the check valve sleeve 162. When the closure member 168 is mated to the upper end portion of the check valve sleeve 162, damping fluid is unable to flow between the upper and lower portions of the working chamber 50 through the flow passages 116–122 of the orifice sleeve 100 as well as the flow passages 144 and 146 of the shutter sleeve 108. However, when the closure member 168 is displaced from the upper surface of the check valve sleeve 162, damping fluid is able to flow between the upper and lower portions of the working chamber 50 through the check valve 160 by way of the flow passages 116–122 of the orifice sleeve 100, and the flow passages 144 and 146 of the shutter sleeve 134.

To bias the closure member 168 against the upper end portion of the check valve sleeve 162, a spring 172 is provided. The spring 172 is disposed within the central bore 138 of the shutter sleeve 134 between the closed upper end portion 136 of the shutter sleeve 134 and the flange 170 of the closure member 168. When the pressure in the lower portion of the working chamber 50 exceeds the pressure in the upper portion of the working chamber 50 so as to overcome the force exerted on the closure member 168 by the spring 172, the damping fluid in the lower portion of the working chamber 50 causes the closure member 168 to compress the spring 172. As the spring 172 is compressed, damping fluid within the check valve sleeve 162 is able to flow from the check valve sleeve 162 through the flow passages 144 and 146 in the shutter sleeve 134 and the flow passages 116–122 in the orifice sleeve 100 into the cavity 106 when the flow passages 116–122 are aligned with the flow passages 144 and 146. The damping fluid in the cavity 106 is then able to flow to the upper portion of the working chamber 50 through the flow passages 174 in the piston rod 56 so as to produce a relatively soft compression stroke. During rebound, the spring 172 causes the closure member 168 to be displaced towards the upper end portion of the check valve sleeve 162 so as to prevent damping fluid in the upper portion of the working chamber 50 to flow to the lower portion of the working chamber 50 through the flow passages 116–122 in orifice sleeve 100 and the flow passages 144–146 in the shutter sleeve 134. Accordingly, a relatively hard rebound stroke is produced by the check valve 160.

From the discussion above, it will be seen that the forces acting on the shutter sleeve 134 are balanced. For example, forces exerted on the shutter sleeve 134 by the damping fluid flowing through the flow passages 108, 112, 116, and 120 are balanced by the flow of damping fluid flowing through the flow passages 110, 114, 118 and 122. Further, the force exerted on the closed upper end portion 136 of the shutter sleeve 134 by the damping fluid in the central bore 138 are balanced by the force exerted by the pressure of the damping fluid within the annular recess 156. In addition, the shutter sleeve 134 and the check valve sleeve 162 are rotationally independent so that the forces acting on the check valve 160 are not transmitted to the shutter sleeve 134. Because the forces acting on the shutter sleeve 134 are balanced, the actuator described below is able to rotate the shutter sleeve 134 without encountering excessive frictional forces. Because the actuator is therefore able to rotate the shutter sleeve at a greater angular velocity, the actuation time of the rotary valve 98 is decreased. Further, the expected longevity of the rotary valve 98 as well as the actuator are increased as less mechanical stress acts upon the rotary valve 98 and the actuator 176.

To drive the rotary valve 98, an actuator 176 is provided which is coaxially disposed within the piston rod 56. The actuator 176 is used for rotating the shutter sleeve 134 so that the rotary valve 98 may control the flow of damping fluid between the upper and lower portions of the working chamber 50. The actuator 176 has a motor/gear portion 178 and a sensor portion 180 which are separated by a circular support plate 182 which is secured to the motor/gear portion 178 by a plurality of screws (not shown). The circular support plate 182 abuts a step 186 in the piston rod 56 so as to prevent upward movement of the actuator 176. In addition, the sensor portion 180 comprises a sensor housing 189 that abuts the step 126 in the orifice sleeve 100 to prevent downward movement of the actuator 176. The sensor housing 188 has an aperture 190 which is used to receive the projection 148 of the shutter sleeve 134 as well as a shaft 154 from the actuator 176. The shaft 154 of the actuator 176 has a rectangular end portion 192 which is able to be received by the slot 152 in the projection 148. Accordingly, rotation of the shaft 154 causes rotation of the projection 148 and hence the shutter sleeve 134. The sensor housing 188 further has a recess 194 at its lower end portion which is able to receive an annular retaining seal 196. The annular retaining seal 196 is disposed within the recess 194 to prevent damping fluid to flow between the sensor housing 188 and the projection 148 of the shutter sleeve 134. Further, an annular retaining seal 197 is located adjacent to the interior surface of the piston rod 56 between the sensor housing 188 and the orifice sleeve 100 so as to prevent damping fluid from flowing therebetween. An annular disk 198 is disposed between the sensor housing 188 and the upper closed end portion 136 of the shutter sleeve 134 so as to limit upward movement of the shutter sleeve 134. While the actuator 176 may be manufactured by Copal Co., Ltd., other suitable actuators may be used.

Figures 10, 11:
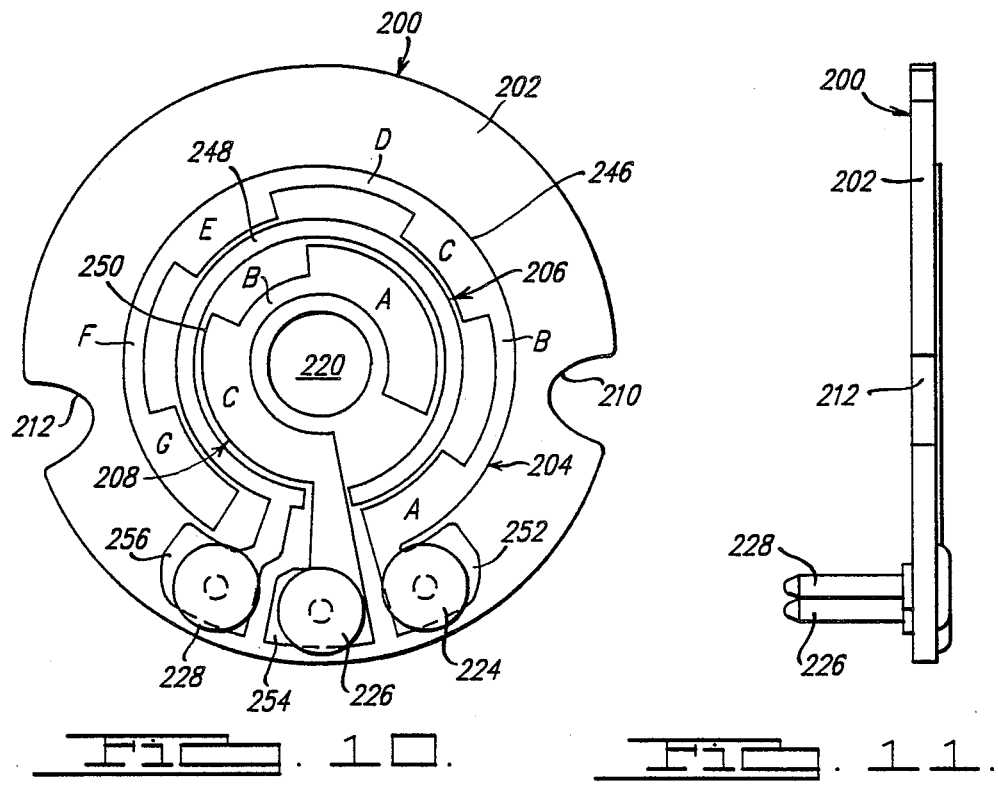
FIGS. 10 and 11 are enlarged views of the encoder disk shown in FIG. 3.

To encode the angular position of the shutter sleeve 134, the actuator 176 further comprises a circular encoder disk 200 as shown in FIGS. 10 and 11. The encoder disk 200 has a planar substrate 202 and a plurality of etched conductors 204–208 disposed thereon. The substrate 202 has two radially inward extending indented regions 210 and 212 on its periphery which are used to receive a plurality of screws (not shown) which secure the encoder disk 200 to a plurality of axially extending projections (not shown) disposed on the circular support plate 182. A circular backing plate 218 is disposed between the projections on the support plate 182 and the encoder disk 200 to support the encoder disk 200. The encoder disk 200 further includes a centrally located aperture 220, which is able to receive the shaft 154 of the actuator 176, as well as a plurality of peripherally disposed pins 224–228. The pins 224–228 are located perpendicular to the plane established by the substrate 202 and electrically communicate with a flex cable 90 which is used to electrically connect the encoder disk 200 to the connector 88.

Figures 8, 9:
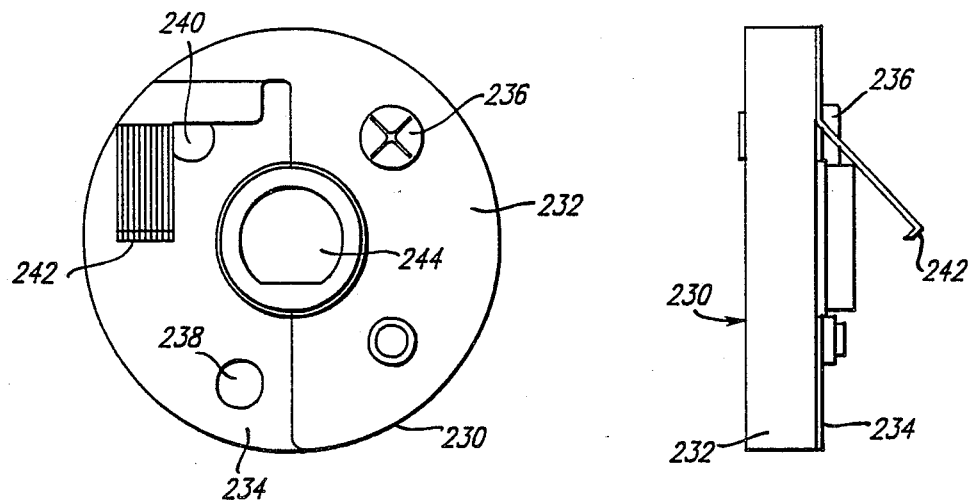
FIGS. 8 and 9 are enlarged views of the brush disk shown in FIG. 3.

The encoder disk 200 is used in conjunction with a brush disk 230 to electrically indicate the position of the shutter sleeve. As shown in FIGS. 8 and 9, the brush disk 230 comprises a disk-shaped substrate 232 with a conductor 234 disposed thereon. The conductor 234 is secured to the substrate 232 of the brush disk 230 by a screw 236 and the locating pins 238 and 240 which are disposed on the substrate 232 and engage holes in the conductor 234. The conductor 234 includes an axially extended brush portion 242 which is able to mate with the conductors 204–208 on the encoder disk 200 in the manner described below. The brush disk 230 further comprises a centrally located aperture 244 which is able to receive the shaft 154 of the actuator 176.

The brush portion 242 and the conductors 204, 206 and 208 are so arranged that when the brush portion 242 contacts the encoder disk 200 in the manner described below, the relative potentials of the conductors 204, 206 and 208 may be used to determine whether the flow passages 140–146 in the shutter sleeve 134 are mated to the flow passages 112, 114, 120 and 122 (producing a soft rebound and compression stroke) or the flow passages 108, 110, 116 and 118 (producing a medium compression and rebound stroke) in the orifice sleeve 100. Further, the encoder disk 200 is able to determine whether there is no alignment between the flow passages 140–146 in the shutter sleeve 134 and the flow passages 108–122 in the orifice sleeve 100 so that a firm rebound and compression stroke is generated.

As shown in FIGS. 10 and 11, the conductors 204, 206 and 208 of the encoder disk 200 have concentric portions 246, 248 and 250 and a radially extending portion 252, 254 and 256. The radially extending portions of 252, 254 and 256 of the conductors 204, 206 and 208 electrically communicate with the pins 224–228 respectively. The concentric portion 250 of the conductor 208 is located closest to the aperture 220, while the concentric portion 248 of the conductor 206 is located adjacent to the perimeter of the concentric portion 250. Finally, the concentric portion 246 of the conductor 204 is disposed further from the aperture 220 than the concentric portion 248 of the conductor 206.

The concentric portion 246 of the conductor 204 comprises regions A–G. The radially inwardmost edge of the regions A, C, E and G are radially closer to the aperture 220 that the radially innermost edges of the regions B, D and F. In addition, the radially outwardmost edge of the regions A–G are substantially the same radial distance from the aperture 220. In a similar fashion, the concentric portion 250 of the conductor 208 is divided into the regions A–C. The radially inwardmost edges of the regions A–C of the conductor 208 is located at substantially the same distance from the aperture 220, while the radially outer edge of the region B of the conductor 208 is located closer to the aperture 220 than the radially outwardmost edges of the regions A and C. Because the brush portion 242 of the brush disk 230 is only able to contact the conductor 204 at regions A, C, E and G, as well as the conductor 208 at regions A and C, the encoder disk 200 is able to indicate eight transitions in damping characteristics in the manner described below.

When the brush portion 242 of the brush disk 230 is located on the region A of the conductor 204, the brush permits electrical communication between the conductor 204 and the conductor 206. Because the conductor 206 is grounded, the voltage at the conductor 204 goes to ground potential. The electronic control module 34 interprets the ground potential appearing on the conductor 204 in the same manner described below as indicating that the shutter sleeve 134 has rotated to a position which will provide a soft compression and rebound stroke. As the brush portion 242 rotates further in a counterclockwise direction, the brush portion 242 contacts both the conductor 206 as well as region A of the conductor 208. Because the conductor 206 is at ground potential, the voltage appearing on the conductor 208 also goes to ground potential. The ground potential appearing on the conductor 208 and not on the conductor 204 is interpreted by the electronic control module 34 as having the shutter sleeve 134 adjusted to provide a firm compression and rebound stroke. As the brush portion 242 rotates further in a counterclockwise direction so as to cause electrical communication between the conductor 206, region A of the conductor 208, and region C of the conductor 204, the voltage appearing on both the conductors 204 and 208 goes to ground potential. The electronic control module 34 interprets ground potential appearing on both the conductors 204 and 208 as indicating that the shutter sleeve 134 has rotated to a position which will provide a medium compression and rebound stroke.

Further rotation of the brush disk 230 in a counterclockwise direction by the shaft 154 causes the brush portion 242 to contact region A of the conductor 208 as well as the conductor 206. Since the conductor 206 is a ground potential, the conductor 208 goes to ground potential while the conductor 204 goes to a higher voltage. The electronic control module 34 interprets the ground potential appearing on the conductor 208 as indicating that the shutter sleeve 134 is adjusted to provide a firm compression and rebound stroke. When the brush portion 242 rotates further in a counterclockwise direction, the brush portion 242 contains the conductor 206 as well as region E of the conductor 204. Because the brush portion 242 contacts only the conductors 204 and 206, only the conductor 204 is brought to ground potential which is interpreted by the electronic control module 34 as indicating that the shutter sleeve 134 is adjusted to provide a soft compression and rebound stroke.

Additional rotation of the brush portion 242 by the shaft 154 causes electrical communication between the conductor 206 and the region C of the conductor 208. Because only the conductor 208 is brought to ground potential, the electronic control module 34 interprets the output from the encoder disk 200 as indicative that the shutter sleeve 134 has rotated to a position which is able to provide a firm compression and rebound stroke. Still further rotation of the brush portion 242 by the shaft 154 causes the brush portion 242 to contact region G of the conductor 204, the conductor 206, as well as region C of the conductor 208. The electronic control module 34 interprets the ground potential appearing on both the conductors 204 and 208 as indicating that the position of the shutter sleeve 134 is such as to provide medium compression and rebound stroke. Further rotation of the brush portion 242 by the shaft 154 causes electrical communication between the conductor 206 and region G of the conductor 204 to terminate, thereby causing electrical communication only between the conductor 206 as well as region C of the conductor 208. The electronic control module interprets the ground potential appearing on the conductor 208 as indicating that the shutter sleeve 134 is adjusted to provide a firm compression and rebound stroke.

Figure 12:
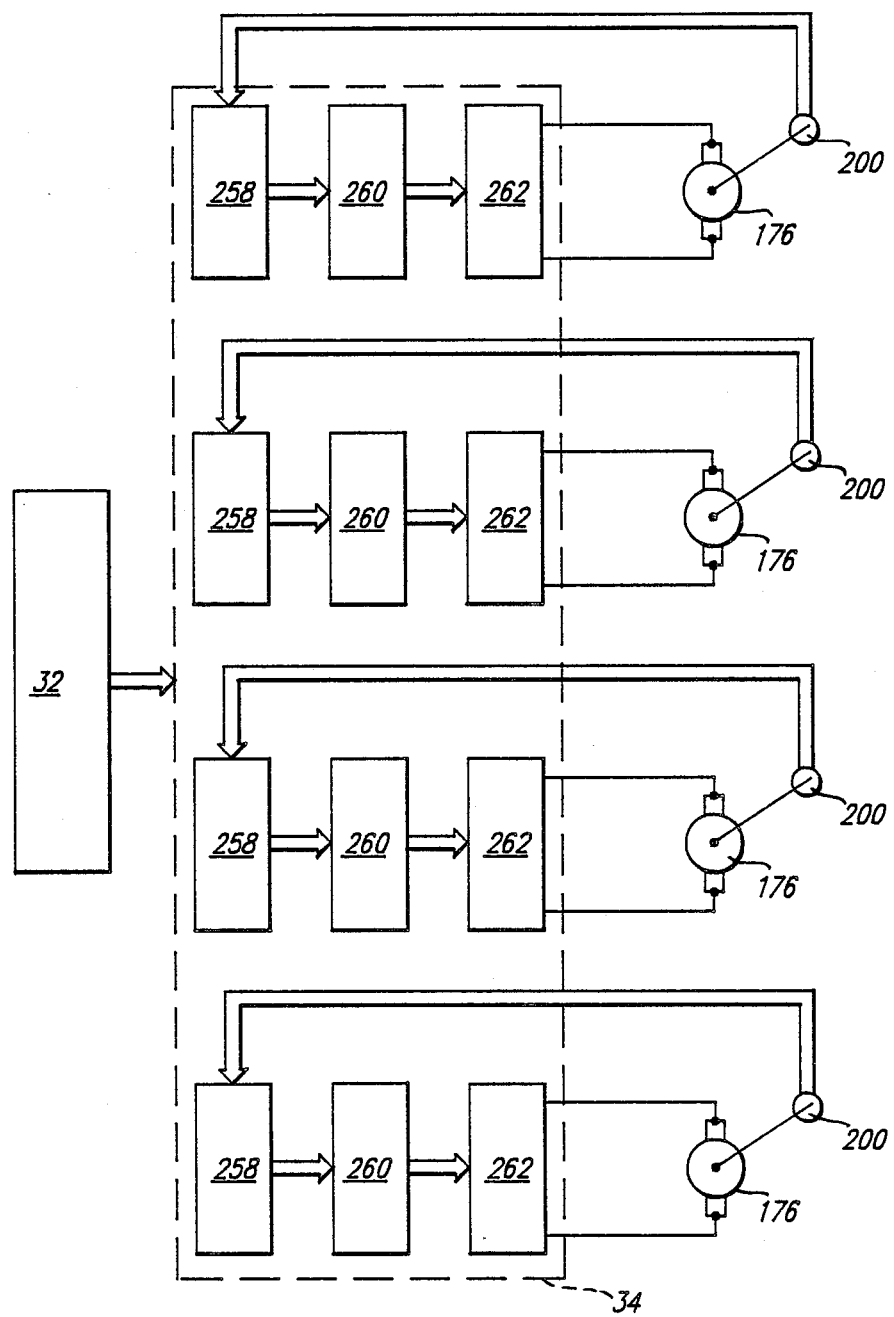
FIG. 12 illustrates the operation of the method and apparatus for controlling shock absorbers according to the first preferred embodiment of the present invention.

To process the outputs from the encoder disk in each of the shock absorbers 10, the electronic control module 34 according to one embodiment of the present invention shown in FIG. 12 comprises a plurality of comparators 258, timers 260, and H-drivers 262. As described more thoroughly below, each of the comparators 258 is used to determine whether the output from the encoder disk 200 to which it is connected has the same logic level as that delivered to the comparators 258 by the switch 32. The output from each of the comparators 258 is delivered to a timing circuit 260 which is used to control the operation of the H-driver 262. The output from each of the H-drivers 262 then is delivered to an actuator 176 which either drives the shutter sleeve 134 forward in a counterclockwise direction, provides a braking torque to the shutter sleeve 134, or causes the shutter sleeve 134 to remain stationary.

Figure 13:
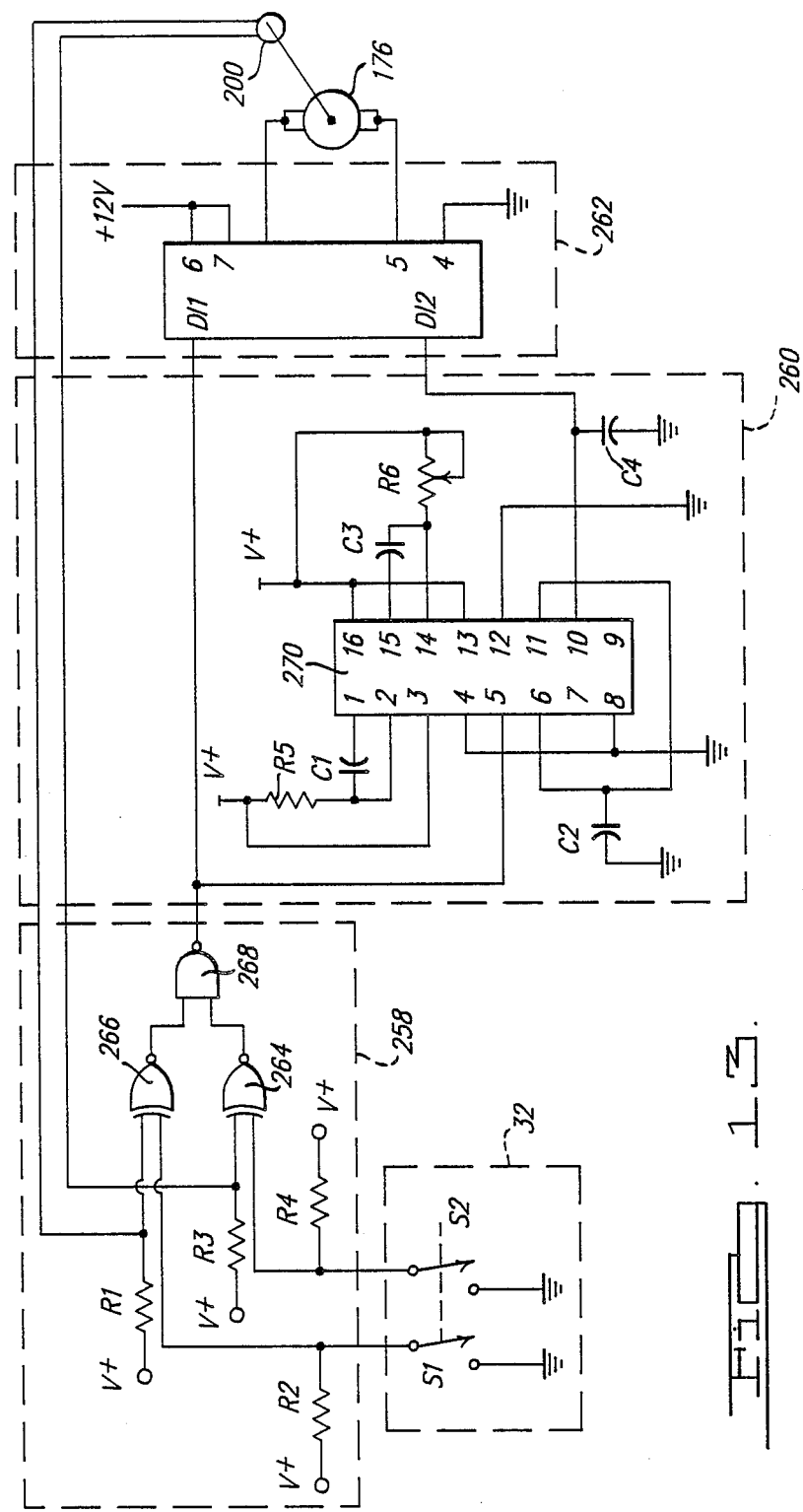
FIG. 13 is a schematic diagram of one portion of the electronic control module shown in FIG. 12.

As shown in FIG. 13, each of the comparators 258 comprise two exclusive NOR gates 264 and 266. The conductor 204 of the encoder disk 200 electrically communicates with INPUT pin 2 of the exclusive NOR gate 266 which in turn is connected to +V (12 volts) through a pull-up resistor R1. In addition, INPUT pin 1 of the exclusive NR gate 266 is connected to the first terminal of the switch S1 which is one-half of the switch 32, as well as to +V through the pull-up resistor R2. The second terminal of the switch S1 is connected to ground. In a similar fashion, INPUT pin 5 of the exclusive NOR gate 264 is connected to the conductor 208 of the encoder disk 200 as well as to V+ through the pull-up resistor R3. The INPUT pin 6 of the exclusive NOR gate 264 is connected to a first terminal of the switch S2 which is one-half of the switch 32, as well as to +V through a pull-up resistor R4. In addition, the second terminal of the switch S2 is connected to the ground. While the exclusive NOR gates 264 and 266 may be part of an MC14077B quad exclusive "NOR" gate manufactured by Motorola, other suitable devices may be used.

Each of the comparators 258 also comprise a NAND gate 268. The input pin 2 of the NAND gate 268 is connected to the OUTPUT pin 3 of the exclusive NOR gate 266. In addition, the INPUT pin 1 of the NAND gate 268 is connected to the OUTPUT pin 4 of the exclusive NOR gate 264. When connected in this manner, the output of the NAND gate 268 follows the position of the switches S1 and S2, as well as the voltage appearing on the conductors 204 and 208, in the manner shown in the following table:

TABLE 1

| S1 | S2 | Potential of Conductor 204 | Potential of Conductor 208 | Output of NAND gate 268 |
|---|---|---|---|---|
| Open | Open | 0 | 0 | +V |
| Open | Open | 0 | +V | +V |
| Open | Open | +V | 0 | +V |
| Open | Open | +V | +V | 0 |
| Open | Closed | 0 | 0 | +V |
| Open | Closed | 0 | +V | +V |
| Open | Closed | +V | 0 | 0 |
| Open | Closed | +V | +V | +V |
| Closed | Open | 0 | 0 | +V |
| Closed | Open | 0 | +V | 0 |
| Closed | Open | +V | 0 | +V |
| Closed | Open | +V | +V | +V |
| Closed | Closed | 0 | 0 | 0 |
| Closed | Closed | 0 | +V | +V |
| Closed | Closed | +V | 0 | +V |
| Closed | Closed | +V | +V | +V |

The NAND gate 268 may be a 74LS126 manufactured by SGS, though other similar devices may be used.

The output from the NAND gate 268 is delivered to the timing circuit 260. The timing circuit 260 is used to generate a 20 microsecond delay when the output of the NAND gate 268 indicates that the voltage applied to the actuator 176 should be changed so as to accommodate switching transistors in the H-driver 262 described below. In addition, the timing circuit 260 is used to limit the time that the voltage delivered to the actuator 176 is reversed to 12 milliseconds so as to prevent the actuator 176 from reversing directions. The timing circuit 260 comprises a dual monostable multivibrator 270 which receives positive supply voltage potential through $V_{DD}$ pin 16 as well as ground potential to $V_{SS}$ pin 8. To create a 20 microsecond delay before reversing the potential applied to the actuator 176 during braking, the $C_X2/R_X2$ pin 2 of the multivibrator 270 is connected to +V through the resistor R5, and to $V_{SS}$ pin 1 through the capacitor C1. In addition, the B1 pin 5 of the multivibrator 270 is connected to OUTPUT pin 3 of the NAND gate 268, while the A1 pin 4 is connected to ground. When a negative going edge of a signal from the OUTPUT pin 3 of the NAND gate 268 is delivered to the B1 pin 5 of the multivibrator 270, the Q1 pin 6 goes logically high for a duration having a time duration approximately represented by:

$$t = R_x C_x$$

where:
$R_x$ equals the resistance of the resistor R5.
$C_x$ is the capacitance of the capacitor C1.

When the resistance of the resistor R5 is 3.3K and the capacitance of the capacitor C1 is 0.01 microfarad, the duration of the logically high output from the Q1 pin 6 of the multivibrator 270 is at least 20 microseconds.

The output from Q1 pin 6 of the multivibrator 270 is delivered to B2 pin 11 as well as to ground through the bypass capacitor C2. Accordingly, when the output from Q1 pin 6 of the multivibrator 270 goes logically low, the output from Q2 pin 10 goes logically high. The duration of the logical output of the Q2 pin 10 is determined by the variable resistor R6 connected between V+ and $C_x2/R_x2$ pin 14 and capacitor C3 connected between the $C_x2/R_x2$ pin 14 and the $V_{SS}$ pin 15. The duration of the pulse has a time constant equal to the capacitance of the capacitor C3 multiplied by the resistance of the variable resistor R6. When the resistance of the resistor R6 is approximately 12 K ohms and the capacitance of the capacitor C3 is 1 microfarad, the duration of the pulse from Q2 pin 10 in 12 milliseconds. The output from Q2 pin 10 is delivered to the H-driver 262 as well as to a bypass capacitor C4 which is connected to ground.

The H-driver 262 of the electronic control module 34 is used for controlling the potential which is delivered to the terminals of the actuator 176. By controlling the voltage applied to the actuator 176, the H-driver 262 is able to cause the actuator 176 to apply a forward counterclockwise torque to the shutter sleeve 134 when the output from the NAND gate 268 is logically high, and then generate a reverse torque on the shutter sleeve 134 for 12 milliseconds after the output from the NAND gate 268 goes logically low. The H-driver 262 therefore controls the actuator in the manner described below:

TABLE 2

| Output from Pin 3 of NAND Gate 268 | Output from Q1 Pin 10 of Multivibrator 270 | Response of Actuator 176 |
|---|---|---|
| +V | +V | Coils grounded |
| +V | 0 | Forward torque applied |
| 0 | +V | Reverse torque applied |
| 0 | 0 | Coils insulated |

Figure 14:
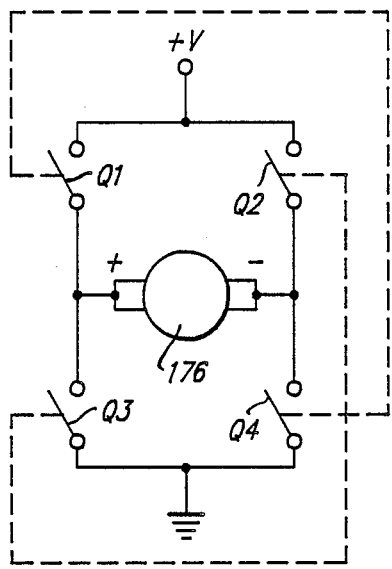
FIGS. 14–16 illustrates the operation of the H-driver shown in FIG. 13.
Figure 15:
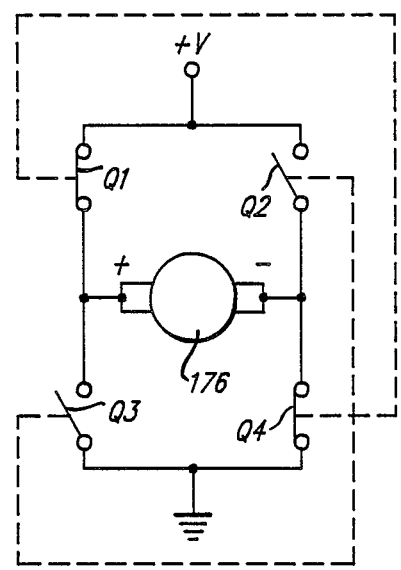
Figure 16:
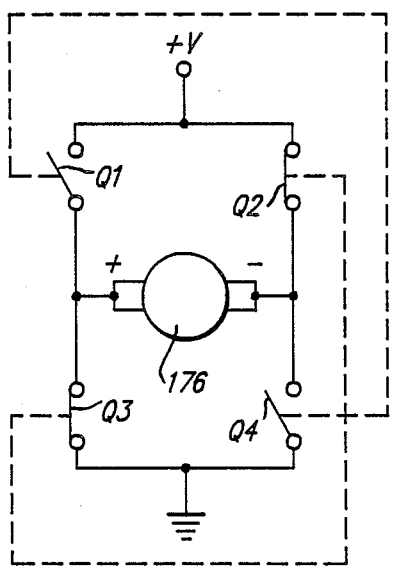

The operation of the H-driver 262 can be explained by reference to FIGS. 14-16. When the inputs to DI1 pin 1 and DI2 pin 2 of the H-driver 262 are both low, the switches Q1-Q4 are open so that the terminals of the actuator 176 are insulated as shown in FIG. 14. When input to DI1 pin 1 of the H-driver 262 is high and input to DI2 pin 2 is low, the switches Q1 and Q4 are closed while the switches Q2 and Q3 are open as shown in FIG. 15. Accordingly, current is able to flow from the positive terminal of the actuator 176 to ground through the negative terminal of the actuator 176 thereby driving the actuator 176 in the forward direction. When the input to DI1 pin 1 of the H-driver 262 is low and the input to DI2 pin 2 is high, the switches Q2 and Q3 are closed while the switches Q1 and Q4 are open as shown in FIG. 16. Current is therefore able to flow from the negative terminal of the actuator 176 to ground through the positive terminal of the actuator 176, thereby driving the actuator 176 in a reverse direction.

Accordingly, by reversing the flow of current through the actuator 176, a reverse torque may be generated by the actuator 176. When this reverse torque is delivered to the shutter sleeve 134, the actuator 176 is able to produce a faster deceleration or braking of the shutter sleeve 134 than would otherwise be possible. For example, the shutter sleeve 134 may stop within approximately three degrees of the position at which the H-driver 262 causes a reverse torque to be generated by the actuator 176, while the shutter sleeve 134 may stop within in excess of 45 degrees if no reverse torque is generated by the actuator 176. By permitting faster deceleration of the shutter sleeve 134, the position of the shutter sleeve 134 may be more accurately controlled. Accordingly, the shutter sleeve 134 may mate with a larger number of flow passages in the orifice sleeve 100 so that the shutter sleeve 134 does not have to rotate as far to change the amount of damping fluid flowing between the upper and lower portions of the working chamber 50. Since the shutter sleeve 134 does not have to rotate as far to change the flow of damping fluid, less time is required to change the damping characteristics of the shock absorber 10.

Figure 17:
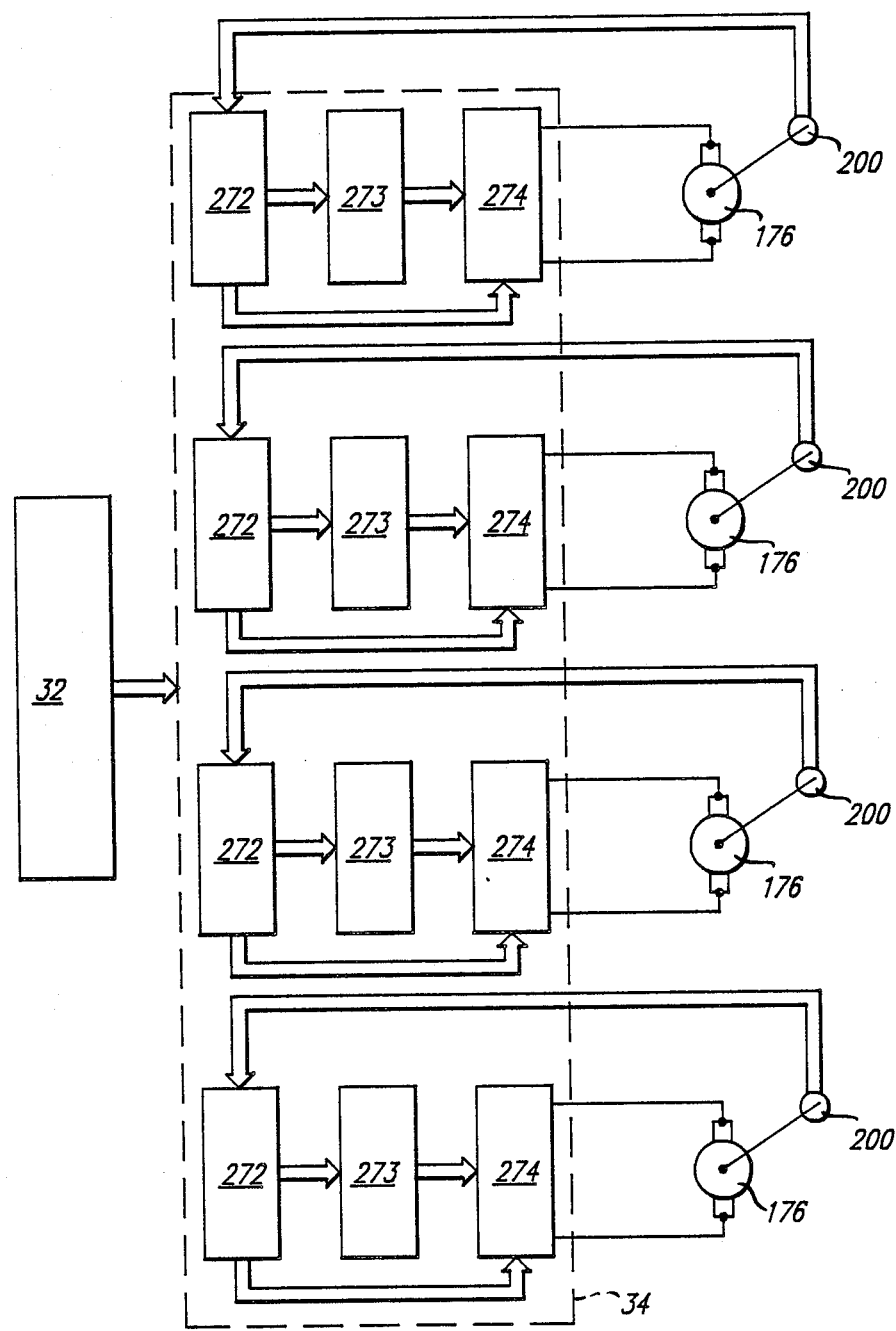
FIG. 17 illustrates the operation of the method and apparatus for controlling the shock absorbers according to the second preferred embodiment of the present invention.
Figure 18:
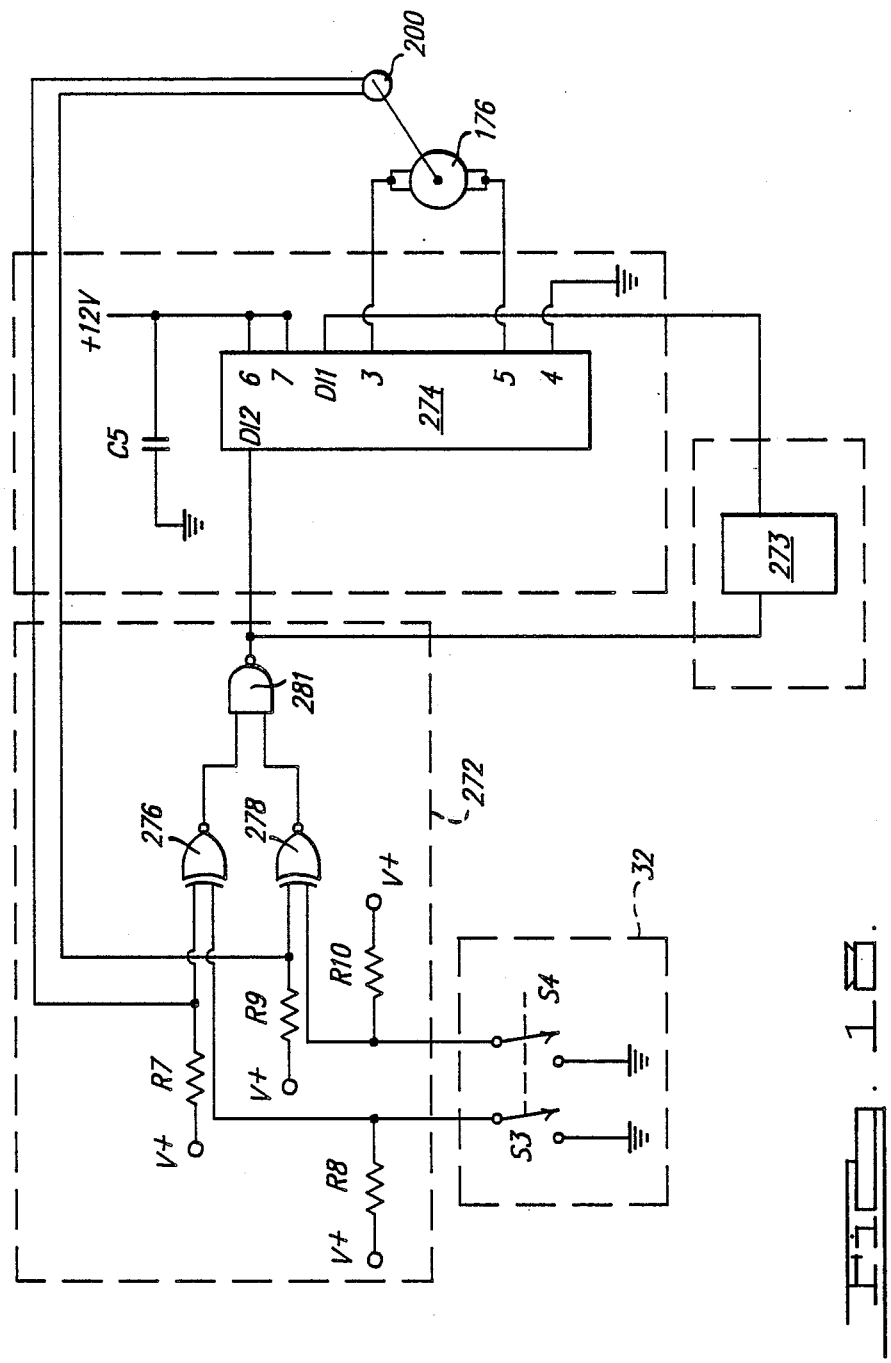
FIG. 18 is a schematic diagram of one portion of the electronic control module shown in FIG. 17.

In a second preferred embodiment shown in FIG. 17, the electronic control module 34 comprises a plurality of comparators 272, delay elements 273 and H-drivers 274. As described more thoroughly below, each of the comparators 272 is used to determine whether the output from the encoder disk 200 to which it is connected has the same logic level as that delivered to the comparators 272 by the switch 32. The output from each of the comparators 272 is delivered through a delay element 273 to the H-driver 274 to which it is connected. The output from the H-driver 274 is then delivered to the actuator 176 to which it is connected and is used to either drive the shutter sleeve 134 in a counterclockwise direction or to ground the coils of the actuator 176. By grounding the coils of the actuator 176, the stored electromagnetic energy in the actuator 176 may be discharged rapidly. By rapidly discharging the electromagnetic energy stored in the coils of the actuator 176, the actuator 176 decelerates faster than would otherwise occur. Accordingly, the shutter sleeve 134 is able to stop at a position which is relatively close to the desired stopping position. For example, when the coils of the actuator 176 are grounded, the shutter sleeve 134 is able to stop within 15 degrees of its desired stopping position.

The comparator 272 comprises two exclusive NOR gates 276 and 278. The conductor 204 of the encoder disk 200 electrically communicates with INPUT pin 2 of the exclusive NOR gate 276 which in turn is connected to +V (12 volts) through a pull-up resistor R7. In addition, INPUT pin 1 of the exclusive NOR gate 276 is connected to the first terminal of the switch S3 as well as to +V through the pull-up resistor R8. The second terminal of the switch S3 is connected to ground. In a similar fashion, INPUT pin 5 of the exclusive NOR gate 278 is connected to the conductor 208 as well as to V+ through the pull-up resistor R9. The INPUT pin 6 of the exclusive NOR gate 278 is connected to a first terminal of the switch S4 as well as to +V through a pull-up resistor R10. In addition, the second terminal of the switch S4 is connected to ground. While the exclusive NOR gates 276 and 278 may be part of an MC14077B quad exclusive "NOR" gate manufactured by Motorola, other suitable devices may be used.

Each of the comparators 272 also comprise an NAND gate 281. The INPUT pin 2 of the NAND gate 281 is connected to the OUTPUT pin 3 of the exclusive NOR gate 276. In addition, the INPUT pin 1 of the NAND gate 281 is connected to the OUTPUT pin 4 of the exclusive NOR gate 278. When connected in this manner, the output of the NAND gate 281 follows the position of the switches S3 and S4, as well as the voltage appearing on the conductors 204 and 208, in the manner shown in the following table:

TABLE 3

| S3 | S4 | Potential of Conductor 204 | Potential of Conductor 208 | Output of NAND gate 281 |
|---|---|---|---|---|
| Open | Open | 0 | 0 | 0 |
| Open | Open | 0 | +V | 0 |
| Open | Open | +V | 0 | 0 |
| Open | Open | +V | +V | +V |
| Open | Closed | 0 | 0 | 0 |
| Open | Closed | 0 | +V | 0 |
| Open | Closed | +V | 0 | +V |
| Open | Closed | +V | +V | 0 |
| Closed | Open | 0 | 0 | 0 |
| Closed | Open | 0 | +V | +V |
| Closed | Open | +V | 0 | 0 |
| Closed | Open | +V | +V | 0 |
| Closed | Closed | 0 | 0 | +V |
| Closed | Closed | 0 | +V | 0 |
| Closed | Closed | +V | 0 | 0 |
| Closed | Closed | +V | +V | 0 |

The NAND gate may be Model 14081B manufactured by Motorola, though other similar devices may be used.

The OUTPUT pin 3 of the NAND gate 281 is connected to the H-driver 274. The H-driver 274 is used to either provide a positive voltage to cause the actuator 176 to rotate in a counterclockwise direction or ground the coils of the actuator 176. The OUTPUT pin 3 of the NAND gate 281 is delivered to the DI2 pin 2 of the H-driver 274, as well as to DI1 pin 1 through the delay element 273. The M(+) pin 3 of the H-driver 274 is connected to one terminal of the actuator 176, while the M(−) pin 5 of the H-driver 274 is connected to the other terminal of the H-driver 274. Further, the $V_{cc}$ pins 6 and 7 are connected to V+ as well as to ground through a bypass capacitor C5. When connected in this manner, the H-driver 274 causes the actuator 176 to operate in a manner described in the following table:

TABLE 4

| Output from Pin 3 of AND Gate 280 | Response of Actuator 176 |
|---|---|
| 0 | Coils grounded |
| +V | Forward torque applied |

Accordingly, the actuator 176 delivers a counterclockwise torque to the shutter sleeve 134 when the output from OUTPUT pin 3 of the NAND gate 281 is logically high. When the OUTPUT pin 3 of the NAND gate 281 goes from a logically high voltage to a logically low voltage, the coils of the actuator 176 are grounded. Because the coils of the actuator 176 are grounded, the energy stored in the electromagnetic field in the actuator 176 is dissipated relatively quickly and therefore the actuator 176 is able to decelerate faster than would otherwise be possible.

Figure 19:
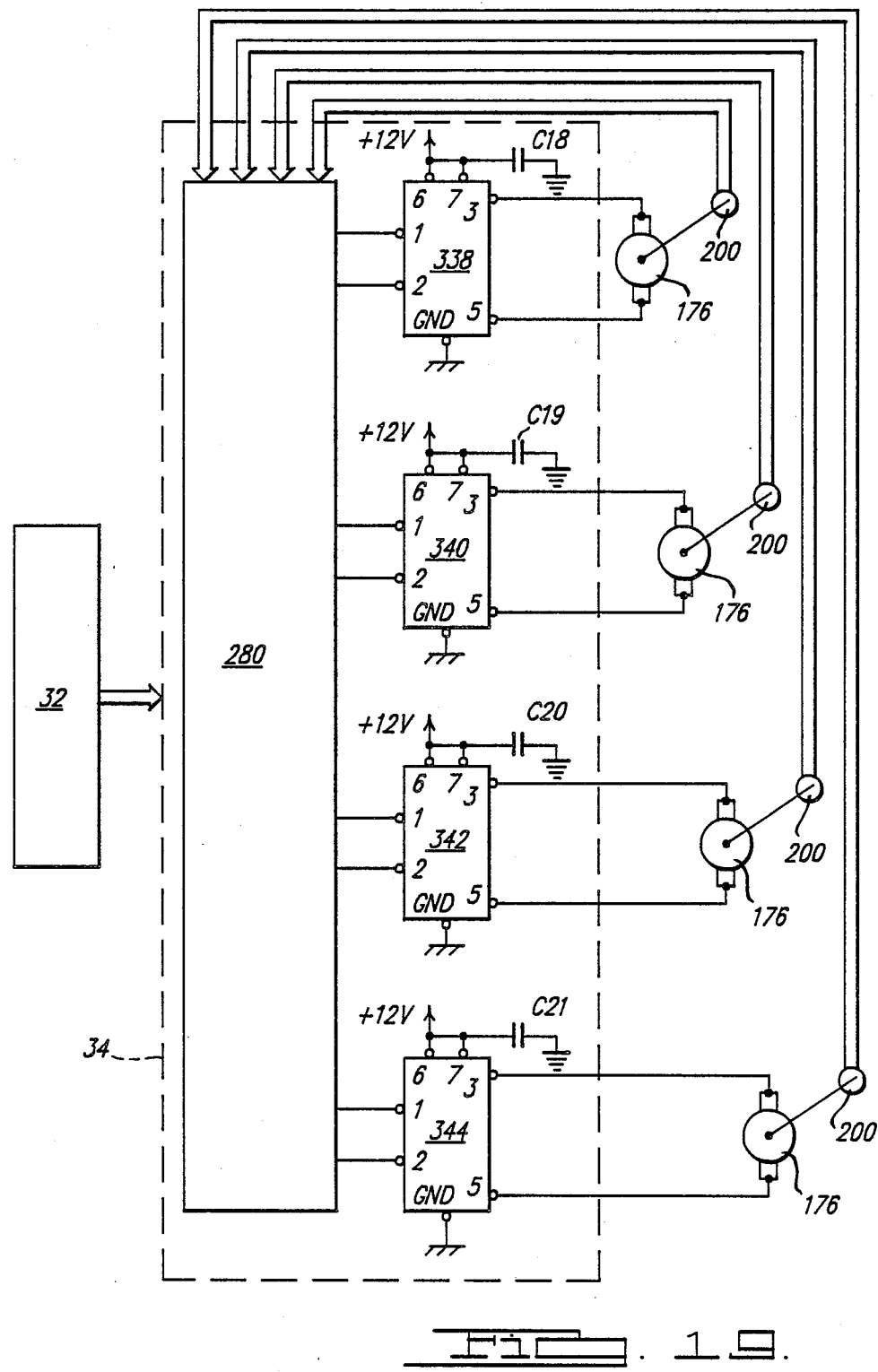
FIG. 19 illustrates the method and apparatus for controlling shock absorbers according to the third preferred embodiment of the present invention.
Figure 20:
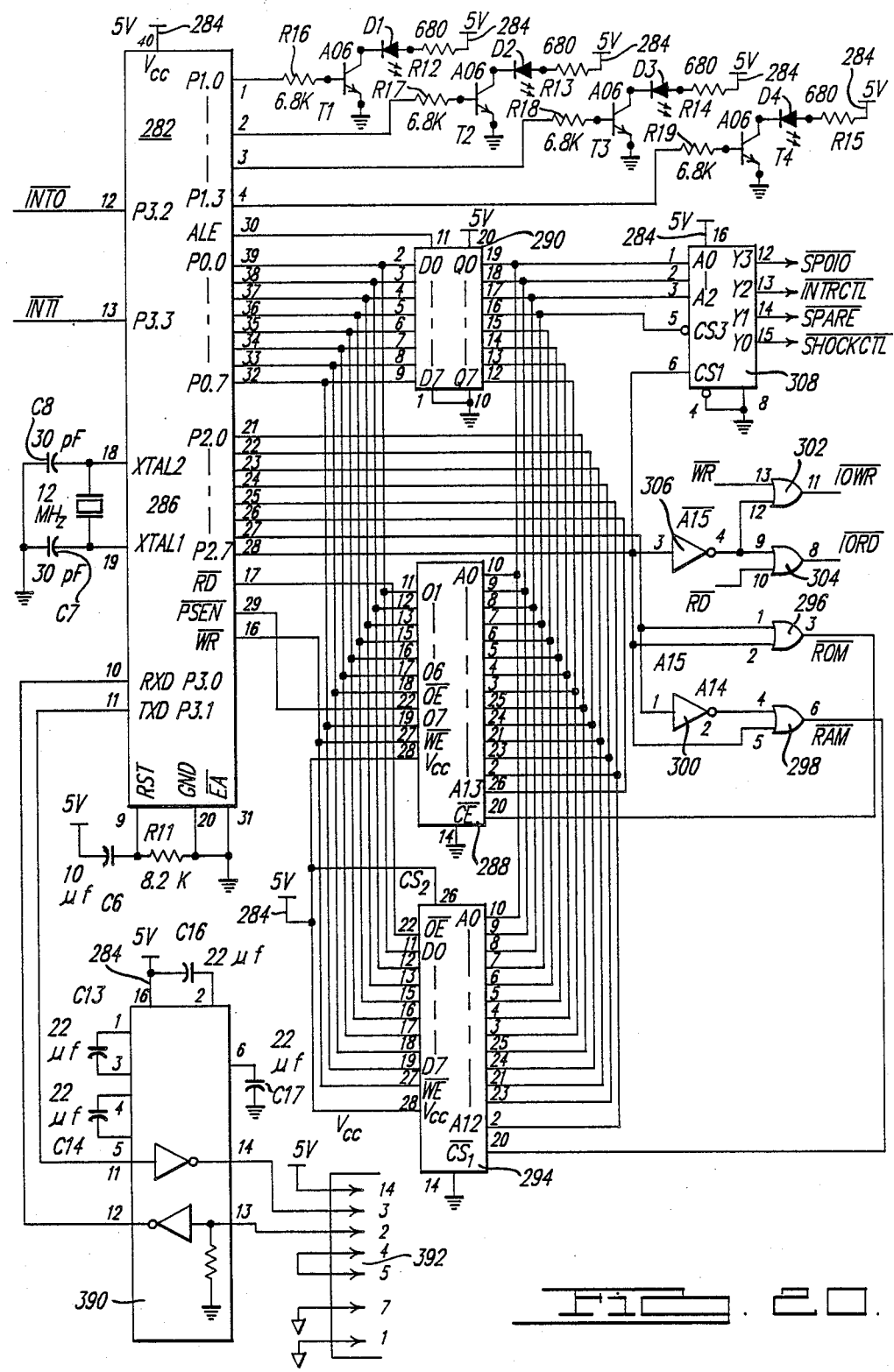
Figure 23A:
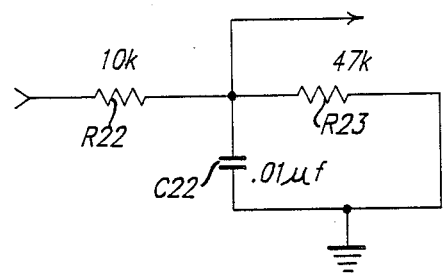
FIG. 23 is a schematic diagram of the signal conditioning circuits shown in FIGS. 21 and 22.
Figure 23B:
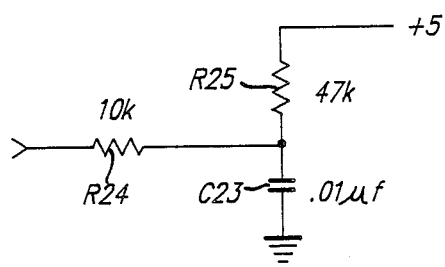
Figure 23C:
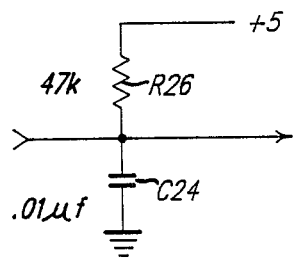

In the third preferred embodiment shown in FIGS. 19–25, the electronic control module 34 includes a computer 280 having a microprocessor 282. As shown in FIG. 20, the microprocessor 282 receives a 5-volts supply voltage from the 5-volt supply bus 284 through $V_{cc}$ pin 40, and is connected to ground through GND pin 20. In addition, the $\overline{EA}$ pin 31 is connected to ground so as to enable the microprocessor 282 to intersect with the memories described below. To ensure that the microprocessor 282 is restarted after the output from the voltage regulator described below has been stabilized, the RST pin 9 is connected to the 5-volt supply bus through the capacitor C6 as well as to ground through the resistor R11. The microprocessor 282 will therefore be restarted a sufficient length of time after the voltage appearing along the 5-volt supply bus 284 has stabilized. In addition, the P3.2 pin 12 of the microprocessor 282 is able to receive the interrupt $\overline{INT0}$ control signal, while the P3.3 pin 13 is able to receive the $\overline{INT1}$ control signal. The operation of the microprocessor 282 with respect to the $\overline{INT0}$ control signal and the $\overline{INT1}$ control signal will be described below. While the microprocessor 282 may be from the 8051A family manufactured by Intel, other suitable microprocessors may be used.

To provide timing pulses to the microprocessor 282, the computer 280 further comprises a 12 megahertz crystal 286. One lead of the crystal 286 is connected to XTAL1 pin 19 of the microprocessor 282 and to ground through the bypass capacitor C7. Further, the XTAL2 pin 18 of the microprocessor 282 is connected to the second lead of the crystal 286 and to ground through the bypass capacitor C8. Accordingly, the crystal 286 is able to provide the appropriate timing for proper operation of the microprocessor 282.

To store the program used by the microprocessor 282, the computer 280 further includes an erasable programmable read only memory ("EPROM") 288 and a latch 290. The latch 290 receives the output from P0.0 pin 39 through P0.7 pin 32 of the microprocessor 282 and delivers the output to $Q_0$ pin 19 through $Q_7$ pin 12 of the latch 290. The latch 290 is controlled by the microprocessor 282 by connecting ENABLE pin 11 of the latch 290 to the address latch enable ALE pin 30 of the microprocessor 282. The $A_0$ pin 10 through the $A_7$ pin 3 of the EPROM 288 receives the output from pins $Q_7$ through $Q_0$ pin 12 of the latch 290. The $\overline{PSEN}$ pin 29 of the microprocessor 282 is delivered to $\overline{OE}$ pin 22 of the EPROM 288 which is used to enable the output of the EPROM 288. Further, because $\overline{WR}$ pin 16 of the microprocessor 282 electrically communicates with $\overline{WE}$ pin 27 of the EPROM 288, the microprocessor 282 is able to control writing operations.

Addressing information from P2.0 pin 21 through P2.5 pin 26 of the microprocessor 282 is also delivered directly to $A_8$ pin 25 through $A_{13}$ pin 26 of the EPROM 288. It should be understood that addressing information need only be delivered to $A_{13}$ pin 26 of the EPROM when the program stored in the EPROM 288 exceeds 8 K in length. If the program is smaller, a smaller EPROM may be used. To permit the microprocessor 282 to receive information from the EPROM 288, $O_0$ pin 11 through $O_6$ pin 18 of the EPROM 288 are connected to P0.0 pin 39 through P0.6 pin 33 of the microprocessor 282 respectively. In addition, the $O_7$ pin 19 of the EPROM 288 is connected to P0.7 pin 32 of the microprocessor 282. Accordingly, when addressing information is delivered from the microprocessor 282 through the latch 290 through pins P0.0 pins 39 through P0.7 pin 32, as well as directly from the microprocessor 282 through pin P2.0 pin 21 through P2.5 pin 26, the information stored at the particular address in the EPROM 288 will be delivered to P0.0 pin 39 through P0.7 pin 32 of the microprocessor 282.

To provide random access memory for the microprocessor 282, a RAM 294 is provided. The $V_{cc}$ pin 28 of the RAM 294 is connected to the 5-volt supply bus 284, while the GND pin 14 is connected to ground. $A_0$ pin 10 through $A_7$ pin 3 of the RAM 294 are connected to $Q_0$ pin 19 through $Q_7$ pin 12 of the latch 290, while $A_8$ pin 25 through $A_{12}$ pin 2 of the RAM 294 are connected to P2.0 pin 21 through P2.5 pin 25 of the microprocessor 282. Data from the RAM 294 is in turn delivered to the microprocessor 282 through $D_0$ pin 11 through $D_7$ pin 19 of the RAM 294 to P0.0 pin 39 through P0.7 pin 32 of the microprocessor 282. To control the output of information from the RAM 294, the $\overline{RD}$ pin 17 of the microprocessor 282 is connected to the $\overline{OE}$ pin 22 of the RAM 294. Further, the microprocessor 282 controls the writing of information to the RAM 294 through $\overline{WR}$ pin 16 of the microprocessor 282 which is connected to the $\overline{WE}$ pin 27 of the RAM 294. In addition, the $CS_2$ pin 26 of the RAM 294 is connected to the 5-volt supply bus 284 so that the RAM 294 is permanently enabled.

To permit the microprocessor 282 to selectively read information from either the EPROM 288 or the RAM 294, the OR gates 296 and 298 and the inverter 300 are provided. The P2.6 pin 27 of the microprocessor 282 is connected to INPUT pin 1 of the OR gate 296 as well as the INPUT pin 1 of the inverter 300. Further, the P2.7 pin 28 of the microprocessor 282 is connected to the INPUT pin 2 of the OR gate 296 as well as the INPUT pin 5 of the OR gate 298. When both P2.6 pin 27 and P2.7 pin 28 of the microprocessor 282 are at logically low levels, the output from OUTPUT pin 3 of the OR gate 296 is logically low which is then delivered to the $\overline{OE}$ pin 1 of the EPROM 288 which in turn enables the EPROM 288. Further, when the output at P2.7 pin 28 of the microprocessor 282 is logically low and the output at P2.6 pin 27 of the microprocessor 282 becomes logically high, the output at OUTPUT pin 6 of the OR gate 296 goes logically low. The logically low output of the OR gate 298 is delivered to the $\overline{CS_1}$ pin 20 of the RAM 294. Accordingly, by controlling the logic levels appearing on P2.6 pin 27 and P2.7 pin 28 of the microprocessor 282, the microprocessor 282 is able to selectively enable the EPROM 288 and the RAM 294.

To permit the microprocessor 282 to control the INPUT/OUTPUT operations of the peripherals (the actuators 176, the encoder disks 200, as well as the analog-to-digital converter and the components used to generate interrupts described below), the computer 280 further comprises the OR gates 302 and 304 and the inverter 306. The $\overline{WR}$ pin 16 of the microprocessor 282 is connected to the INPUT pin 13 of the OR gate 302, while the P2.7 pin 28 of the microprocessor 282 is connected to the INPUT pin 12 of the OR gate 302 through the inverter 306. When connected in this manner, the $\overline{IOWR}$ control signal is delivered to the OUTPUT pin 11 of the OR gate 302 which is used to address the peripherals indicated above in a WRITE mode in the manner described below. Further, the INPUT pin 9 of the OR gate 304 is connected to the P2.7 pin 28 of the microprocessor 282 through the inverter 306, while the INPUT pin 10 of the OR gate 304 is connected to the $\overline{RD}$ pin 17 of the microprocessor 282. When connected in this manner, an $\overline{IORD}$ control signal is generated from the output from OUTPUT pin 10 of the OR gate 304 which is used to control the reading operation from various sensors as well as from the encoder disk 200 of each of the shock absorbers 10 in the manner described below.

To provide additional control signals which control the actuators 176 as well as signals from various other sensors described below, a decoder 308 is provided. The $V_{cc}$ pin 16 of the decoder 308 is connected to the 5-volt supply bus 284, while the GND pin 8 of the decoder 308 is connected to ground. The A0 pin 1 through A2 pin 3 of the decoder 308 are connected to the P0.0 pin 39 through the P0.2 pin 37 of the microprocessor 282 through the latch 290. In addition, the CS3 pin 5 of the decoder 308 is connected to P0.3 pin 36 of the microprocessor 282, while CS1 pin 6 of the decoder 308 is connected to P2.7 pin 28 of the microprocessor 282. When connected in this manner, the decoder 308 is able to generate the following control signals:

TABLE 5

| Pin | Control Signal |
| --- | --- |
| Y3 pin 12 | SP0IO |
| Y2 pin 13 | INTRCTL |
| Y1 pin 14 | SPARE |
| Y0 pin 15 | SHOCKCTL |

These control signals are used in the manner described below.

To allow visual indication of the damping characteristics which the shock absorber 10 is providing as well as an indication of hardware failure, a plurality of light emitting diodes D1-D4 are provided. One lead of each of the light emitting diodes D1-D4 is connected to the 5-volt supply bus 284 through the current limiting resistors R12-R15. In addition, the second lead of each light emitting diode D1-D4 is connected to the collector of a plurality of transistors T1-T4 respectively. The base of the transistor T1 is connected to the P1.0 pin 1 of the microprocessor 282 through a resistor R16, while the base of the transistor T2 is connected to P1.1 pin 2 of the microprocessor 282 through the resistor R17. In a similar fashion, the bases of the transistors T3 and T4 are connected to the P1.2 pin 3 and P1.3 pin 4 of the microprocessor 282 respectively through the resistors R18 and R19. Because the emitters of the transistors T1-T4 are connected to ground, the light enabling diodes D1-D4 will illuminate when a logically high signal is delivered to the bases of the transistors T1-T4 through the resistors R16-R19 respectively. When the program described below is used in conjunction with the microprocessor 282, the light emitting diodes D1-D3 will illuminate when the shock absorbers 10 are adjusted to provide a firm, medium or soft compression stroke respectively. Further, the light emitting diode D4 will illuminate when the software described below has indicated that a hardware failure has occurred.

The computer 280 also comprises a voltage regulator 310 which is used to provide a source of supply potential. The $V_{IN}$ pin 1 of the regulator 310 is connected to the 12-volt positive supply terminal of the battery (not shown) of the automobile 12 through the diode D5, as well as to ground through the filter capacitor C9. In addition, the $V_{IN}$ pin 1 of the regulator 310 is connected to ground through a metal oxide varistor 312 which acts as a surge suppressor. Further, the housing of the regulator 310 represented as pin 3 is connected to ground, while the $V_{OUT}$ pin 2 of the regulator 310 is connected to the 5-volt supply bus 284. The $V_{OUT}$ pin 2 of the regulator 310 is connected to ground through the capacitors C10 and C11 as well as through the light emitting diode D6 and the resistor R21. Accordingly, the light emitting diode D6 will illuminate when the $V_{OUT}$ pin 2 of the regulator 310 is delivering a 5-volt potential to the 5-volt supply bus 284.

To receive the output from the encoder disk 200 associated with each shock absorber 10, an octal tri-state buffer 314 is provided as shown in FIG. 21B. The buffer 314 is used for receiving the outputs from the encoder disks 200 and delivering the outputs to the microprocessor 282 in response to the $\overline{IORD}$ and $\overline{SHOCKCTL}$ control signals. To supply the buffer 314 with operating voltage, the $V_{cc}$ pin 20 is connected to the 5-volt supply bus 284, while the GND pin 10 is connected to ground. The A1 pin 2 through the A4 pin 8, as well as the B1 pin 11 through the B4 pin 17, of the buffer are connected to the conductors 204 and 208 of the encoder disk 200 of the shock absorbers 10 through the signal conditioning circuits 316-330. The signal conditioning circuits 316-330 are used for filtering noise from the signals delivered to the buffer 314 from the encoder disks 200, and each comprise the resistors R24 and R25, as well as the capacitor C23 connected in the manner shown in FIG. 23(b). The output from the buffer 314 is delivered by YA1 pin 18 through YA4 pin 12, as well as YB1 pin 9 through YB4 pin 3, to P0.0 pin 39 through P0.7 pin 32 of the microprocessor 282. The microprocessor 282 is able to control the buffer 314 by delivering the $\overline{IORD}$ control signal from OUTPUT pin 8 of the OR gate 304 to INPUT pin 4 of a OR gate 332, as well as by delivering the $\overline{SHOCKCTL}$ control signal from Y0 pin 15 of the decoder 308 to the INPUT pin 5 of the OR gate 332. The output from OUTPUT pin 6 of the OR gate 332 is delivered to the AEN pin 1 as well as the BEN pin 19 of the buffer 314 which is used for enabling the buffer 314.

To drive the actuators 176 associated with each of the shock absorbers 10 in response to the output from the microprocessor 282, a tri-state octal D flip-flop 334 is provided. The $V_{cc}$ pin 20 of the flip-flop 334 is connected to the 5-volt supply bus 284, while the GND pin 10 and the $\overline{OE}$ pin 1 of the flip-flop 334 are connected to ground. The microprocessor 282 delivers signals to the D0 pin 2 through D7 pin 9 of the flip-flop 334 through P0.0 pin 39 through P0.7 pin 32 of the microprocessor 282. The output from Q0 pin 19 through Q7 pin 12 of the flip-flop 334 are delivered to a shock absorber driver circuit 336 which represents the plurality of H-drivers 338-344 as shown in FIG. 19, with the D0 pin 19 through the D7 pin 7 of the flip-flop 334 being connected to the DI1 pins 1 and the DI2 pins 2 of the H-drivers 338-344. As also shown in FIG. 19, the M(+) pins 3 and the M(−) pins 5 of the H-drivers 338-344 are connected to the positive and negative terminals of the actuators 176 respectively. In addition, the $V_{cc}$ pins 6 and 7 of each of the H-drivers 338-344 are connected to a +12 volt supply as well as to ground through the bypass capacitors C18-C21 respectively.

To control the flip-flop 334, an OR gate 346 is provided. The INPUT pin 12 of the OR gate 346 is connected to the OUTPUT pin 11 of the OR gate 302 so as to receive the $\overline{IOWR}$ control signal. In addition, the INPUT pin 13 of the OR gate 346 is connected to the Y0 pin 15 of the decoder 308 so as to receive the $\overline{SHOCKCTL}$ control signal. A low-to-high transition is delivered from the OR gate 346 to the CLOCK pin 11 of the flip-flop 334 when either the initially low $\overline{IOWR}$ or $\overline{SHOCKCTL}$ control signals go logically high. This action latches in the information on P0.0 pin 39 through P0.7 pin 32 of the microprocessor 282.

The damping characteristics of the shock absorbers may be altered depending on a wide variety of characteristics. For example, it may be desirable for the damping characteristics of a shock absorber change in response to engine RPM. It also may be desirable to have the shock absorber respond to changes in vehicle speed, acceleration, steerage, as well as the application of the vehicle brakes. For this reason, the computer 280 may interface with a number of sensors (not shown) which are used to sense engine RPM, vehicle speed, steerage and brake application. The outputs from these sensors are delivered to the signal conditioning circuits 348–356 shown in FIG. 22 which are used for filtering noise. The signal conditioning circuits 348, 350 and 356 each comprise the resistors R22 and R23 as well as the capacitor C22 connected in the manner shown in FIG. 23(a), while the signal conditioning circuits 352 and 354 each comprise the resistors R26 and the capacitor C24 connected in the manner shown in FIG. 23(c). The outputs from the signal conditioning circuit 348 and 350 are delivered to the CK1 pin 13 and CK2 pin 11 of a dual D flip-flop 358, while the output from the signal conditioning circuits 352–354 are delivered to the CK1 pin 3 and CK2 pin 11 of the dual D flip-flop 360 through the inverters 349, 351, 353 and 355. Similarly, the output from the signal conditioning circuit 356 is delivered to the CK1 pin 3 of the dual D flip-flop 362, while the CK2 pin 11 of the dual D flip-flop 362 is connected to an analog-to-digital converter described below.

The D1 pins 2, S1 pins 4, D2 pins 12 and S2 pins 10 of the flip-flops 358–362 are connected to the 5-volt supply bus 284. In addition, the Q1 pins 5 of the flip-flops 358–362 are connected to the A1 pin 2, B2 pin 13 and A3 pin 6 of an octal tri-state buffer 364. Further, the Q2 pins 9 of the flip-flops 358–362 are connected to the B1 pin 11, A4 pin 8 and A2 pin 4 of the buffer 364 respectively. The 2Y4 pin 3 through the 2Y1 pin 9 of the buffer 364, as well as the 1Y1 pin 18 through the 1Y4 pin 12 of the buffer 364, are connected to the P0.0 pin 39 through P0.7 pins 32 of the microprocessor 282. Accordingly, the buffer 364 is used to provide an output to the microprocessor 282 in response to the inputs from the signal conditioning circuits 348–356 which vary according to engine RPM, vehicle speed, steerage and brake application. Supply potential is delivered to the buffer 364 through the $V_{cc}$ pin 20 which is connected to the 5-volt supply bus 284, and the GND pin 10 is connected to ground. The buffer 364 is controlled by an OR gate 366 in which the OUTPUT pin 3 is connected to the A pin 1 and the B pin 19 of the buffer 364. The INPUT pin 1 of the OR gate 366 receives the $\overline{IORD}$ control signal from the OUTPUT pin 8 of the OR gate 304, while the INPUT pin 2 of the OR gate 366 receives the $\overline{INTRCTL}$ control signal from the Y2 pin 13 of the decoder 308. A low-to-high transition is delivered from the OR gate 366 to the A pin 1 and B pin 19 of the flip-flop 364 when either the initially low $\overline{IORD}$ and $\overline{INTRCTL}$ control signals go logically high. This action laches in the information on the P0.0 pin 39 through the P0.7 pin 32 of the microprocessor 282.

To indicate when a signal has been received by one of the flip-flops 358–362 from one of the signal conditioning circuits 348–356, the NOR gates 368 and 370 are provided. The INPUT pin 8 of the NOR gate 368 is connected to the Q1 pin 5 of the flip-flop 358, while the INPUT pin 9 of a NOR gate 368 is connected to the Q2 pin 9 of the flip-flop 358. The output from the NOR gate 368 is used to generate on $\overline{INT0}$ control signal which is delivered to the P3.2 pin 12 of the microprocessor 282. In a similar fashion, the INPUT pin 2 of the NOR gate 370 is connected to the Q1 pin 5 of the flip-flop 360, while the INPUT pin 3 of the NOR gate 370 is connected to the Q2 pin 9 of the flip-flop 360. Further, the INPUT pin 4 of the NOR gate 370 is connected to the Q1 pin 5 of the flip-flop 362, while the INPUT pin 5 of the NOR gate is connected to the Q2 pin 9 of the flip-flop 362. The output from the OUTPUT pin 1 of the NOR gate 370 is used to generate an $\overline{INT1}$ control signal which is delivered to the P3.3 pin 13 of the microprocessor 282.

To reset the flip-flops 358–362 that capture the interrupt information from the signal conditioning circuits 348–356, the computer 280 further includes an octal tri-state D-type flip-flop 372. Supply potential is delivered to the flip-flop 372 $V_{cc}$ pin 20 through the 5-volt supply bus 284, while the GND pin 10 and the $\overline{OE}$ pin 1 of the flip-flop 372 are connected to ground. The D0 pin 2 through D7 pin 9 of the flip-flop 372 are connected to P0.0 pin 39 through P0.7 pin 32 of the microprocessor 282, while the Q2 pin 17 through Q7 pin 12 of the flip-flop 372 are connected to either the R2 pin 113 or R1 pin 1 of the flip-flops 358–362. The flip-flop 372 is controlled by an OR gate 374 in which the OUTPUT pin 8 is connected to the CK pin 11 of the flip-flop 372. The INPUT pin 9 is connected to OUTPUT pin 11 of the OR gate 302 so that the OR gate 374 receives the $\overline{IOWR}$ control signal, while the INPUT pin 10 of the OR gate 374 is connected to the Y2 pin 13 of the decoder 308 so as to receive the $\overline{INTRCTL}$ control signal. A low-to-high transition is delivered from the OR gate 374 to the CLOCK pin 11 of the flip-flop 372 when either the $\overline{IOWR}$ or $\overline{INTRCTL}$ control signals go logically high. This action laches in the information appearing on P0.0 pin 39 through P0.7 pin 32 of the microprocessor 282.

In some instances, it may be desirable to sense the position of the throttle of the automobile 12 and adjust the shock absorbers 10 in response. Accordingly, the analog-to-digital converter 376 shown in FIG. 21a may be used. Supply potential is delivered to the analog-to-digital converter 376 by connecting the $V_{cc}$ pin 11 to the 5-volt supply bus 284, while connecting the GND pin 13 as well as the REF pin 16 of the analog-to-digital converter 376 to ground. The supply voltage from the throttle (not shown) is delivered to the REF pin 12 of the analog-to-digital converter 376, while the analog throttle position signal is delivered to the IN0 pin 26 of the analog-to-digital converter 376. The IN1 pin 27 through the IN7 pin 5 of the analog-to-digital converter 376 are connected to ground and are available for other analog inputs which may be found desired. The A pin 25, B pin 24 and C pin 23 of the analog-to-digital converter 376 are connected to Q0 pin 19 through Q2 pin 17 of the latch 290, and are used to provide addressing information to the analog-to-digital converter 376. The output from the analog-to-digital converter 376 is delivered to P0.0 pin 39 through P0.7 pin 32 of the microprocessor 282 so that the microprocessor 282 can determine, based on all inputs, whether the actuators 176 should be energized to rotate the shutter sleeve 134.

To provide timing pulses to the analog-to-digital converter 376, the computer 280 further comprises the inverters 384–388. The OUTPUT pin 10 of the inverter 388 is connected to CLK pin 10 of the analog-to-digital converter 376, as well as to the INPUT pin 5 of the inverter 384 through the resistor R20. In addition, the OUTPUT pin 6 of the inverter 384 is connected to the INPUT pin 9 of the inverter 386. Further, the OUTPUT pin 8 of the inverter 386 is connected to the resistor R20 through the capacitor C12, as well as to INPUT pin 11 of the inverter 388. When connected in this manner, the inverters 384-388 are able to deliver clock signals to the CLK pin 10 of the analog-to-digital converter 376 having a time constant depending on the resistance of the resistor R20 as well as the capacitance of the capacitor C12.

The microprocessor 282 is able to control the analog-to-digital converter via the NOR gates 378 and 380, the AND gate 382 and the inverter 383. The INPUT pin 1 of the AND gate 382 is connected to P2.7 pin 28 of the microprocessor 282, while the INPUT pin 2 of the AND gate 382 is connected to the P0.3 pin 36 of the microprocessor 282. The OUTPUT pin 3 of the AND gate 382 is delivered to the INPUT pin 6 of the NOR gate 378, as well as the INPUT pin 2 of the NOR gate 300, through the inverter 383. The INPUT pin 5 of the NOR gate 378 receives the $\overline{IOWR}$ control signal from the OUTPUT pin 11 of the OR gate 302. The OUTPUT pin 4 of the NOR gate 378 is in turn connected to the START pin 6 as well as to the ALE pin 22 of the analog-to-digital converter 376. Similarly, the INPUT pin 3 of the NOR gate 380 is connected to the $\overline{OUTPUT}$ pin 8 of the OR gate 304 so as to receive the $\overline{IORD}$ control signal. The OUTPUT pin 1 of the NOR gate is in turn connected to the OE pin 9 of the analog-to-digital converter 376.

After the analog-to-digital converter 376 converts the analog throttle position signal into digital form, the analog-to-digital converter 376 delivers an end-of-conversion signal from the EOC pin 7 of the analog-to-digital converter 376 to the CK2 pin 11 of the D flip-flop 362. The end-of-conversion signal is processed in the manner described above which allows the microprocessor 282 to read the digitized throttle position signal. After the microprocessor 282 has received the throttle position signal, the microprocessor 282 will generate an $\overline{INTRCTL}$ control signal which then is delivered to the OR gates 366 and 374 in the manner described above.

Under certain circumstances, it may be appropriate to externally receive and transmit data to the microprocessor 282. Under such circumstances, it may be desirable to have the computer 280 further comprise an RS232 interface 390 as well as an RS232 port 392 as shown in FIG. 20. The INPUT pin 11 of the RS232 interface 390 is connected to the TXD P3.1 pin 11 of the microprocessor 282, while the OUTPUT pin 12 of the RS232 interface 390 is connected to the RXD P3.0 pin 11 of the microprocessor 282. In addition, the OUTPUT pin 14 and the INPUT pin 13 of the RS232 interface 390 are connected to the RS232 port 392. Pin 1 of the RS232 interface 390 is connected to pin 3 of the RS232 interface 390 through the capacitor C13, while pin 4 of the RS232 interface 390 is connected to pin 5 of the RS232 interface 390 through the capacitor C14. The RS232 interface 390 receives the supply potential from the 5-volt supply bus 284 through pin 16, which is also connected to pin 2 through the capacitor C15. Finally, pin 6 of the RS232 interface 390 is connected to ground through the bypass capacitor C17. When connected in this manner, the RS232 port 392 is able to directly receive and transmit information to the microprocessor 282 through the RS232 interface 390.

Figure 24:
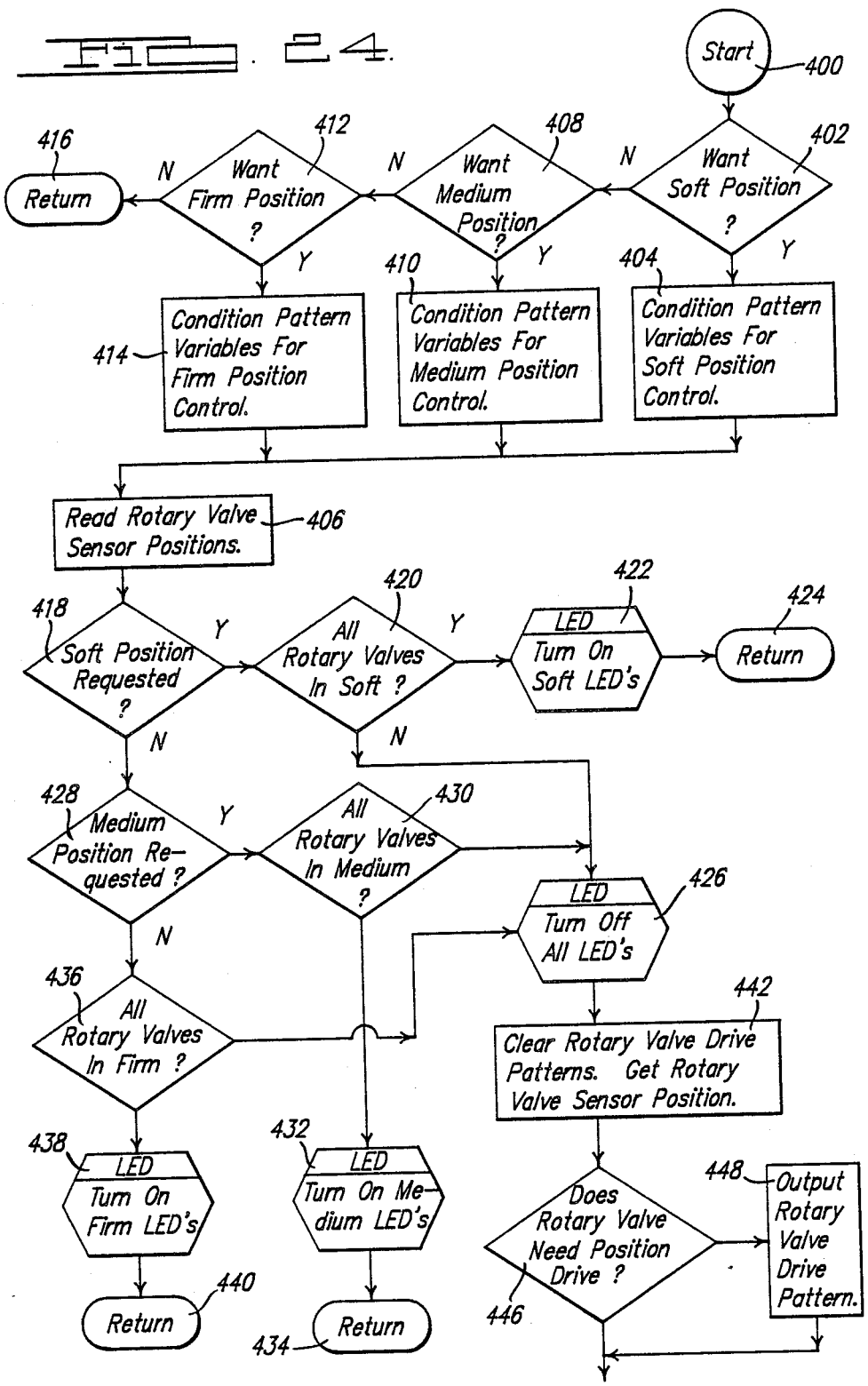
FIGS. 24 and 25 are flow charts illustrating the program which is used for controlling the microprocessor shown in FIG. 19 according to the third preferred embodiment of the present invention.
Figure 25:
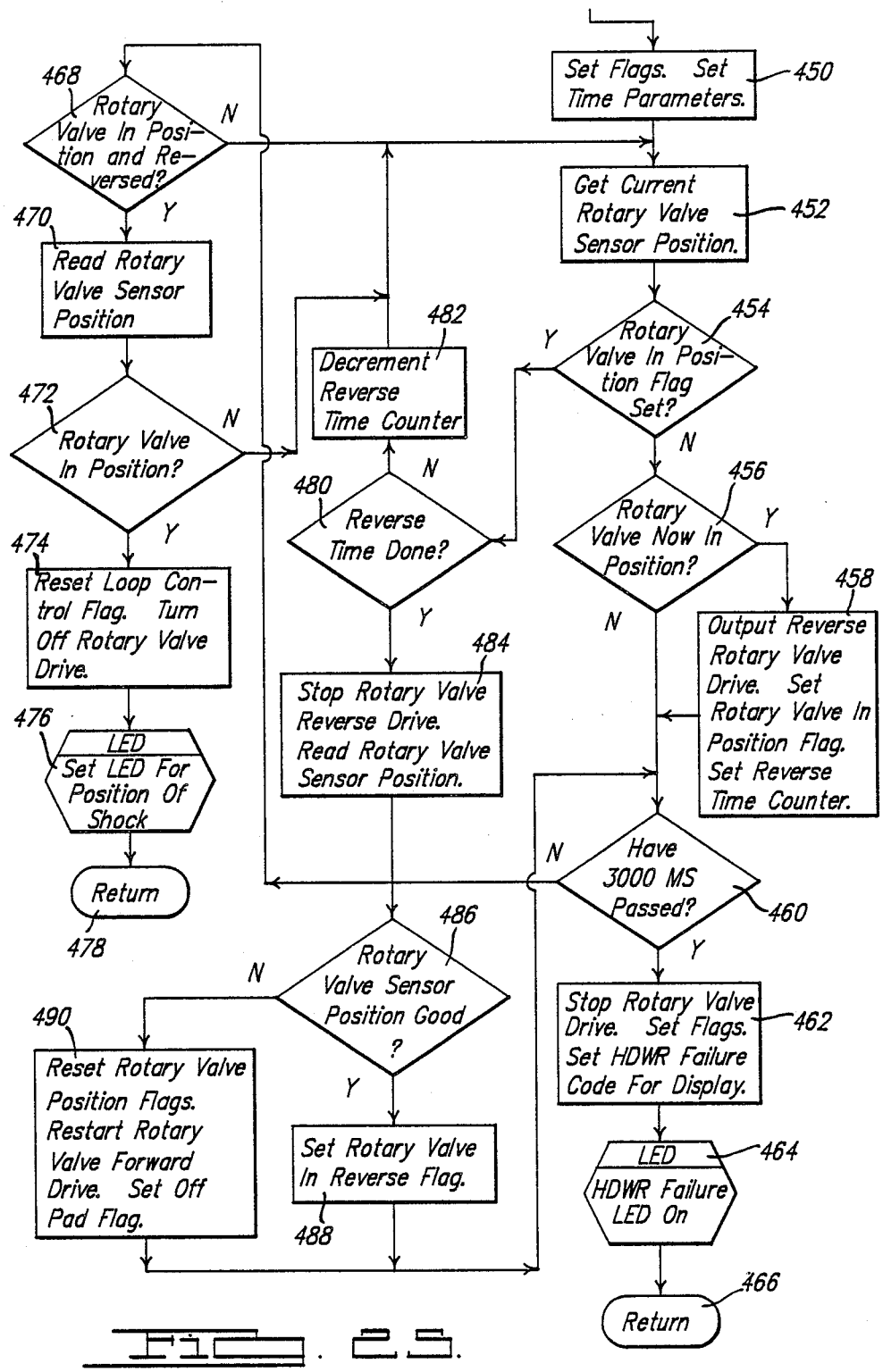

The operation of the microprocessor 282 is controlled by a main program (not shown) and at least one subprogram. The main program is used for determining when the damping characteristics of the shock absorber 10 should be changed in response to engine RPM, vehicle speed, acceleration, steerage, as well as the application of the vehicle brakes. The subprogram is used for actually changing the damping characteristics of the shock absorbers 10, the preferred embodiment of which is shown in FIGS. 24 and 25. After execution begins at step 400, the microprocessor 282 determines whether a soft rebound compression stroke is desirable at step 402. If a soft rebound and compression stroke is desirable, the program branches to step 404 which loads the condition pattern variables for a soft compression and rebound stroke to a predetermined portion of the RAM 294 and then the output from the encoder disks 200 are read at step 406. If a soft compression and rebound stroke is not desired, step 402 branches to step 408 at which point the microprocessor 282 determines whether the medium compression and rebound stroke is desired. If a medium compression and rebound stroke is desired, the program branches to step 410 in which the condition pattern variables for a medium compression and rebound stroke are loaded into the RAM 294 and then the outputs of the encoder disks 200 are read at step 406.

If a medium rebound and compression stroke is not desired, the program branches to step 412 in which the microprocessor 282 determines whether a firm rebound and compression stroke is desired. If a firm rebound stroke is desired, the program branches to step 414 in which the condition pattern variables for a firm compression and rebound stroke are loaded into the RAM 294 and then the outputs from the encoder disks 200 are read at step 406. If a firm compression and rebound stroke is not desirable, processing flows to step 416 which returns control to the main program.

After the outputs from the encoder disks 200 are read at step 406, the microprocessor 282 determines from the condition pattern variables loaded into the RAM 294 whether a soft rebound and compression stroke is desired at step 418. If a soft rebound and compression stroke is desired, the program branches to step 420 in which the microprocessor 282 determines whether all the rotary valves 98 are adjusted to provide a soft compression and rebound stroke. If each of the actuators 176 have driven the shutter sleeves 134 of the rotary valves 98 to a position which is able to provide a soft rebound and compression stroke, the program branches to step 422 in which a subroutine LED is executed. The subroutine LED is used to cause the microprocessor 282 to selectively illuminate the light emitting diodes D1-D4. At step 422, the LED subroutine illuminates light emitting diode D3 which indicates that the shock absorbers 10 are providing a soft rebound and compression stroke. Processing from step 422 returns to the main program by the return step 424. If the microprocessor 282 determines at step 420 that not all the rotary valves 98 are adjusted to provide soft compression and rebound stroke, the program branches to step 426 which will be described subsequently.

If the microprocessor 282 determines in step 418 that a soft compression and rebound stroke is not desired, the program branches to step 428 in which the microprocessor 282 determines whether a medium compression and rebound stroke is desired. If a medium rebound and compression stroke is desired, the program branches to step 430 where the microprocessor 282 determines whether all the rotary valves 98 are adjusted to provide a medium compression and rebound stroke. If all the rotary valves 98 are adjusted to provide a medium compression and rebound stroke, the program branches to step 432 which then executes the LED subroutine to turn on the light emitting diode D2 indicating that a medium rebound and compression stroke is being generated. Processing then returns to the main program by means of the return step 434. If the microprocessor 282 determines at step 430 that not all the rotary valves 98 are adjusted to provide a medium compression and rebound stroke, the program branches to step 426 described below.

If at step 428 the microprocessor 282 determines that the condition pattern variables for a medium compression and rebound stroke had not been loaded into the RAM 294, the program branches to step 436 which determines whether all the rotary valves 98 have been adjusted to provide a firm rebound and compression stroke. If all the rotary valves 98 have been adjusted to provide a firm rebound and compression stroke, the LED subroutine is executed at step 438 which causes the microprocessor 282 to illuminate the light emitting diode D1 indicating that a firm compression and rebound stroke is being generated. Control of the processing returns to the main program via the return step 440.

If at step 436 the microprocessor 282 determines that not all the rotary valves are adjusted to provide a firm compression and rebound stroke, the program branches to step 426. At step 426, the LED subroutine is executed in such a manner as to turn off the light emitting diodes D1–D3. After the step 426 is executed, the program then clears the motor drive patterns at step 442 and obtains the position of each of the rotary valves 98. After step 442, the program branches to four identical routines, each of which are directed to one shock absorber individually. For purposes of this presentation, only one of these routines will be described which comprises steps 446.

At step 446, the microprocessor 282 determines whether the rotary valve 98 should be rotated. If the microprocessor 282 determines that the rotary valve 98 is to be rotated, the microprocessor 282 executes step 448 in which the output rotary drive pattern is loaded into the flip-flop 334. After the step 448 has been executed, or if the rotary valve 98 does not need to be driven, the microprocessor 282 executes step 450. At step 450, the microprocessor 282 sets the following flags:

TABLE 6

| Flag | Function |
|---|---|
| Rotary Valve in Position Flag | Indicates whether the position of the shutter sleeve 134 with respect to the orifice sleeve 100 is correct. |
| Rotary Valve in Reverse Flag | Indicates that the microprocessor 282 has applied a reverse torque to the rotary valve 98. |
| Off Pad Flag | Indicates that the brush portion 236 of the brush disk 230 is not on the proper region of the conductors 204–208 after positioning. |

In addition, the microprocessor at 282 also at step 450 sets a 3,000 millisecond timer which is discussed below.

The microprocessor 282 then executes step 452 in which it loads the position of the brush disk 230 into the microprocessor 282. After executing step 452, the microprocessor 282 determines whether the Rotary Valve in Position Flag is set at step 454. If the Rotary Valve in Position Flag is not set, the microprocessor 282 executes step 456 in which the microprocessor 282 determines whether the rotary valve 98 is in the desired position. If the rotary valve 98 is in position, the step 458 is executed. At step 458, the polarity of the inputs to the actuator 176 associated with the rotary valve 98 are reversed, and the reverse time counter is set. In addition, the Rotary Valve in Position Flag is also set. After step 458 has been executed, or if at step 456 the microprocessor 282 determines that the rotary valve 98 is not in position, the microprocessor 282 executes step 460 in which the microprocessor 282 determines whether 3,000 milliseconds has lapsed since the actuator 176 was energized. If 3,000 milliseconds has lapsed, the microprocessor 282 executes step 462 in which the rotary valve 98 is stopped and the appropriate flags described above are set. Further, the microprocessor 282 also so generates a hardware failure code which is then used at step 464 for illuminating the light emitting diode D4. Processing then returns to the main program through a return step 466.

If at step 460, the microprocessor determines that 3,000 milliseconds has not elapsed since the actuator 176 was energized, the microprocessor 282 executes step 468. At step 468, the microprocessor 282 determines whether the rotary valve 98 is positioned and has been reversed by checking the status of the Rotary Valve in Position Flag as well as the Rotary Valve in Reverse Flag. If the microprocessor 282 determines that the rotary valve 98 is positioned and has been reversed, the microprocessor 282 executes step 470 at which the microprocessor 282 reads the output from the encoder disk 200. Next, at step 472 the microprocessor 282 determines whether the rotary valve 98 is in the position requested. If the rotary valve 98 is in the position requested, the microprocessor 282 executes step 474 in which the microprocessor 282 resets the loop control flag as well as turns off the actuator 176. The microprocessor 282 then executes step 476 in which the LED subroutine is executed so as to indicate the position of the shock absorber 10. Control is then returned to the main program through the return step 478.

If at step 454 the microprocessor 282 determines that the Rotary Valve in Position Flag is set, the microprocessor 282 executes step 480 which determines whether the rotary valve 98 has been driven in reverse the desired length of time (i.e., 12 milliseconds). If the rotary valve 98 has not been driven in reverse the desired length of time, the microprocessor 282 executes step 482 which decrements a reverse time counter. The microprocessor 282 then executes step 452 described above. If at step 482 the microprocessor 282 determines that the rotary valve 98 has been reversed for the desired length of time, the microprocessor 282 executes step 484 which terminates the reverse drive of the rotary valve 98, as well as reads the position of the rotary valve 98. The microprocessor 282 then executes step 486 at which the position of the rotary valve 98 is compared to its desired position. If the position of the rotary valve 98 is the same as its desired position, the microprocessor 282 executes step 488 which sets the Rotary Valve Motor in Reverse flag and then step 460 is executed. If at step 486 the microprocessor 282 determines that the position of the rotary valve 98 is not that which is desired, the microprocessor 282 executes step 490 which resets the Rotary Valve Motor Position flags and causes the rotary valve 98 to be driven forward. In addition, the microprocessor 282 also at step 490 causes an Off Pad flag to be set. The microprocessor 282 then executes step 460.

While it will be apparent that the preferred embodiments illustrated above are well calculated to fulfill the objects stated, it will be appreciated that the present invention is acceptable to modification, variation and change without departing from the scope of the invention. For example, the electronic control module may contain other circuits, and the microprocessor may execute other types of programs. Accordingly, the scope of the invention is to be measured against the scope of the following claims.

What is claimed is:

1. An apparatus for controlling shock absorbers comprising:
   a pressure cylinder forming a working chamber having first and second portions operable to store damping fluid;
   first valve means for establishing a first plurality of flow passages, said first valve means being disposed within said pressure cylinder;
   a second valve means for establishing a second plurality of flow passages, said second valve means being disposed within said pressure cylinder and being displaceable with respect to said first valve means, the displacement of said second valve means with respect to said first valve means operable to vary the flow of damping fluid between said first and second portions of said working chamber;
   actuator means for displacing said second valve means with respect to said first valve means, said actuator means operable to provide an accelerating and decelerating force to said second valve means; and
   control means for controlling the displacement of said second valve member with respect to said first valve means.

2. The apparatus of claim 1, wherein said actuator means is operable to apply an accelerating force to said second valve means when the voltage of a first polarity is delivered to said actuator means, said actuator means operable to provide a decelerating force to said second valve means when a voltage of a second polarity is delivered to said actuator means, said control means operable to control the polarity of voltage delivered to said actuator means.

3. The apparatus of claim 2, wherein said actuator means comprises means for encoding the displacement of said second valve means with respect to said first valve means.

4. The apparatus of claim 3, wherein said means for encoding is operable to permit said control means to determine whether said second valve means has been displaced with respect to said first valve means to one of at least eight positions.

5. The apparatus of claim 4, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said second region.

6. The apparatus of claim 5, wherein said actuator means further comprises means for causing selective electrical communication between said encoder conductors of said means for encoding.

7. The apparatus of claim 6, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

8. The apparatus of claim 6, wherein the width of said brush portion is sufficiently large to cause electrical communication between a first of said encoder conductors and said first plurality of regions of a second said encoder conductors while being sufficiently narrow to avoid electrical communication between said first of said encoder conductors and said second regions of said second of said encoder conductors.

9. The apparatus of claim 1, wherein said control means comprises an H-driver operable to control the voltage to said actuator means.

10. The apparatus of claim 9, wherein said apparatus further comprises a switch operable to select the damping characteristics of said shock absorber.

11. The apparatus of claim 10, wherein said control means further comprises a comparator and said actuator comprises an encoder disk operable to electrically indicate the rotary position of said second valve means with respect to said first valve means, said comparator operable to compare the output of said switch to the output of said encoder disk.

12. The apparatus of claim 11, wherein said comparator comprises two exclusive NOR gates having first and second inputs, the first input from each of said exclusive NOR gates electrically communicating with said encoder disk, the second inputs from each of the NOR gates electrically connected to said switch.

13. The apparatus of claim 11, wherein said control means further comprises a timing circuit electrically communicating with said H-driver and said comparator, said timing circuit operable to limit the duration that said decelerating force is applied to said second valve means.

14. An apparatus for controlling shock absorbers comprising:
   a pressure cylinder forming a working chamber having first and second portions operable to store damping fluid;
   first valve means for establishing a first plurality of flow passages, said first valve means being disposed within said pressure cylinder;
   second valve means for establishing a second plurality of flow passages, said second valve means being disposed within said pressure cylinder and being displaceable with respect to said first valve means, the displacement of said second valve means with respect to said first valve means operable to vary the flow of damping fluid between said first and second portions of said working chamber;
   actuator means for displacing said second valve means with respect to said first valve means, said actuator means operable to provide an accelerating force to said second valve means, said actuator means comprising a plurality of electrical coils operable to store electromagnetic energy; and
   control means for controlling the displacement of said second valve member with respect to said first valve means, said control means operable to ground the coils of said actuator means to dissipate the electromagnetic energy.

15. The apparatus of claim 14, wherein said control means comprises an H-driver operable to control the voltage to said actuator means.

16. The apparatus of claim 15, wherein said apparatus further comprises a switch operable to select the damping characteristics of said shock absorber.

17. The apparatus of claim 16, wherein said control means further comprises a comparator and said actuator comprises an encoder disk operable to electrically indicate the rotary position of said second valve means with respect to said first valve means, said comparator operable to compare the output of said switch to the output of said encoder disk.

18. The apparatus of claim 17, wherein said comparator comprises two exclusive NOR gates having first and second inputs, the first input from each of said exclusive NOR gates electrically communicating with said encoder disk, the second inputs from each of the NOR gates electrically connected to said switch.

19. The apparatus of claim 14, wherein said actuator means comprises means for encoding the displacement of said second valve means with respect to said first valve means.

20. The apparatus of claim 19, wherein said means for encoding is operable to permit said control means to determine whether said second valve means has been displaced with respect to said first valve means to one of at least eight positions.

21. The apparatus of claim 20, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said second region.

22. The apparatus of claim 21, wherein said actuator means further comprises means for encoding selective electrical communication between said encoder conductors of said means for encoding.

23. The apparatus of claim 22, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

24. The apparatus of claim 23, wherein the width of said brush portion is sufficiently large to cause electrical communication between a first of said encoder conductors and said first plurality of regions of a second of said encoder conductors and said first plurality of regions of a second of said encoder conductors while being sufficiently narrow to avoid electrical communication between said first of said encoder conductors and said second regions of said second of said encoder conductors.

25. An apparatus for controlling shock absorbers comprising:
a pressure cylinder forming a working chamber having first and second portion operable to store damping fluid;
first valve means for establishing a first plurality of flow passages, said first valve means being disposed within said pressure cylinder;
second valve means for establishing a second plurality of flow passages, said second valve means being disposed within said pressure cylinder and being displaceable with respect to said first valve means, the displacement of said second valve means with respect to said first valve means operable to vary the flow of damping fluid between said first and second portions of said working chamber;
actuator means for displacing said second valve means with respect to said first valve means, said actuator means operable to provide an accelerating and decelerating force to said second valve means; and
a computer for controlling the displacement of said second valve member with respect to said first valve means.

26. The apparatus of claim 25, wherein said actuator means is operable to apply an accelerating force to said second valve means when the voltage of a first polarity is delivered to said actuator means, said actuator means operable to provide a decelerating force to said second valve means when a voltage of a second polarity is delivered to said actuator means, said control means operable to control the polarity of voltage delivered to said actuator means.

27. The apparatus of claim 26, wherein said actuator means comprises means for encoding the displacement of said second valve means with respect to said first valve means.

28. The apparatus of claim 27, wherein said means for encoding is operable to permit said control means to determine whether said second valve means has been displaced with respect to said first valve means to one of at least eight positions.

29. The apparatus of claim 28, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said second region.

30. The apparatus of claim 29, wherein said actuator means further comprises means for causing selective electrical communication between said encoder conductors of said means for encoding.

31. The apparatus of claim 30, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

32. The apparatus of claim 30, wherein the width of said brush portion is sufficiently large to cause electrical communication between a first of said encoder conductors and said first plurality of regions of a second of said encoder conductors while being sufficiently narrow to avoid electrical communication between said first of said encoder conductors and said second regions of said second of said encoder conductors.

33. The apparatus of claim 25, wherein said computer comprises an H-driver operable to control the voltage to said actuator means.

34. The apparatus of claim 33, wherein said apparatus further comprises a switch operable to select the damping characteristics of said shock absorber.

35. The apparatus of claim 34, wherein said control means further comprises a comparator and said actuator comprises an encoder disk operable to electrically indicate the rotary position of said second valve means with respect to said first valve means, said comparator operable to compare the output of said switch to the output of said encoder disk.

36. A method for controlling the flow of damping fluid between the first and second portions of the working chamber of a shock absorber comprising:
   permitting damping fluid in the first portion of said working chamber to fluidly communicate with first valve means for controlling the flow of damping fluid;
   permitting damping fluid in said second portion of said working chamber to fluidly communicate with second valve means for controlling the flow of damping fluid;
   applying as accelerating force on said second valve means to cause displacement of said second valve means with respect to said first valve means in response to a first signal from control means for controlling the displacement of said second valve means with respect to said first valve means; and
   applying a decelerating force to said second valve means when said second valve means has been displaced with respect to said first valve means by a predetermined amount in response to a second signal from said control means.

37. The method of claim 36, wherein said accelerating and decelerating force is delivered to said second valve means by actuator means for displacing said second valve means with respect to said first valve means, said actuator means being operable to apply an accelerating force to said second valve means when the voltage of a first polarity is delivered to said actuator means, said actuator means operable to provide a decelerating force to said second valve means when a voltage of a second polarity is delivered to said actuator means, said control operable to control the polarity of voltage delivered to said actuator means.

38. The method of claim 37, wherein said actuator means comprises means for encoding the displacement of said second valve means with respect to said first valve means.

39. The method of claim 38, wherein said means for encoding is operable to permit said control means to determine whether said second valve means has been displaced with respect to said first valve means to one of at least eight positions.

40. The method of claim 39, wherein said means for encoding comprises a substrate with three encoder conductors disposed thereon, each of said conductors having a circular portion and radially extending portion, said circular portion of at least one of said encoder conductors having a first and second plurality of regions, said first plurality of regions being disposed closer to the center of said circular region than said region.

41. The method of claim 36, wherein said actuator means further comprises means for causing selective electrical communication between said encoder conductors of said means for encoding.

42. The method of claim 41, wherein said means for causing selective electrical communication between said conductors comprises a brush disk, said brush disk comprising a circular substrate with conductor disposed thereon, said conductor of said brush disk having a brush portion which is disposed adjacent to said encoder conductors.

43. The method of claim 42, wherein the width of said brush portion is sufficiently large to cause electrical communication between a first of said encoder conductors and said first plurality of regions of a second of said encoder conductors while being sufficiently narrow to avoid electrical communication between said first of said encoder conductors and said second regions of said second of said encoder conductors.

44. The method of claim 36, wherein said control means comprises an H-driver operable to control the voltage to said actuator means.

45. The method of claim 44, wherein said control means electrically communicates with a switch.

46. The method of claim 45, wherein said control means further comprises a comparator and said actuator comprises an encoder disk operable to electrically indicate the rotary position of said second valve means with respect to said first valve means, said comparator operable to compare the output of said switch to the output of said encoder disk.

47. The method of claim 46, wherein said comparator comprises two exclusive NOR gates having first and second inputs, the first input from each of said exclusive NOR gates electrically communicating with said encoder disk, the second inputs from each of the NOR gates electrically connected to said switch.

48. The method of claim 46, wherein said control means further comprises a timing circuit electrically communicating with said H-driver and said comparator, said timing circuit operable to limit the duration that said decelerating force is applied to said second valve means.

* * * * *

UNITED STATES PATENT AND TRADEMARK OFFICE
CERTIFICATE OF CORRECTION

PATENT NO. : 4,890,858

DATED : January 2, 1990

INVENTOR(S) : David R. Blankenship

It is certified that error appears in the above-identified patent and that said Letters Patent is hereby corrected as shown below:

On the title page:

FOREIGN PATENT DOCUMENTS, "3334704.2 4/1985 Fed. Rep. of Germany" should be --P3334704.2 4/1985 Fed. Rep. of Germany--.

Column 3, Line 51, "inoperative" should be --in operative--.

Column 6, Line 15, "54" should be --56--.

Column 9, Line 58, "189" should be --188--.

Column 11, Line 13, "that" should be --than--.

Column 11, Line 37, delete "same" before --manner--.

Column 12, Line 3, "contains" should be --contacts--.

Column 12, Line 59, "NR" should be --NOR--

UNITED STATES PATENT AND TRADEMARK OFFICE
CERTIFICATE OF CORRECTION

PATENT NO. : 4,890,858

DATED : January 2, 1990

INVENTOR(S) : David R. Blankenship

It is certified that error appears in the above-identified patent and that said Letters Patent is hereby corrected as shown below:

Column 13, Line 49, delete "voltage" after --supply--.

Column 14, Line 19, "in" should be --is--.

Column 15, Line 41, "grounded" should be --ground--.

Column 15, Line 64, "an" should be --a--.

Column 17, Line 1, "intersect" should be --interact--.

Column 17, Line 39, insert after "$Q_7$" --through pin 19--.

(TABLE 5):
Column 19, Lines 17-20, "SPOIO" should be --$\overline{\text{SPOIO}}$--.
"INTRCTL" should be --$\overline{\text{INTRCTL}}$--.
"SPARE" should be --$\overline{\text{SPARE}}$--.
"SHOCKCTL" should be --$\overline{\text{SHOCKCTL}}$--.

Column 21, Line 68, "on" should be --an--.

UNITED STATES PATENT AND TRADEMARK OFFICE
CERTIFICATE OF CORRECTION

PATENT NO. : 4,890,858

DATED : January 2, 1990

INVENTOR(S) : David R. Blankenship

Page 3 of 3

It is certified that error appears in the above-identified patent and that said Letters Patent is hereby corrected as shown below:

Column 22, Line 23, "113" should be --13--.

Column 23, Line 12, insert "376" after --converter--.

Column 24, Line 29, insert "and" after --rebound--.

Column 24, Line 30, insert "compression" before --stroke--.

Column 24, Line 41, "at" should be --as--.

Column 28, Line 13, Claim 8, insert "cf" after --second--.

Column 29, Line 41, Claim 22, "encoding" should be --causing--.

Column 29, Line 64, Claim 25, "portion" should be --portions--.

Column 31, Line 19, Claim 36, "as" should be --an--.

Signed and Sealed this

Twenty-fourth Day of September, 1991

Attest:

HARRY F. MANBECK, JR.

*Attesting Officer*   Commissioner of Patents and Trademarks